United States Patent [19]
Monta et al.

[11] Patent Number: 5,914,875
[45] Date of Patent: Jun. 22, 1999

[54] METHOD AND APPARATUS FOR DIAGNOSING PLANT ANOMALY

[75] Inventors: Kazuo Monta; Yoji Takizawa, both of Yokohama, Japan

[73] Assignee: Kabushiki Kaisha Toshiba, Japan

[21] Appl. No.: 08/782,888

[22] Filed: Jan. 10, 1997

[30] Foreign Application Priority Data

Jan. 11, 1996 [JP] Japan .................................... 8-003371
Jun. 28, 1996 [JP] Japan .................................... 8-169480

[51] Int. Cl.⁶ .................................................. G05B 23/02
[52] U.S. Cl. ......................... 364/184; 364/186; 364/185; 376/245; 395/180; 395/183.02; 395/183.01
[58] Field of Search .................................... 364/186, 184; 376/245; 395/180, 183.02, 183.01, 183.22

[56] References Cited

U.S. PATENT DOCUMENTS

| | | |
|---|---|---|
| 4,093,991 | 6/1978 | Christie, Jr. et al. . |
| 4,864,842 | 9/1989 | Regimand . |
| 4,866,644 | 9/1989 | Shenk et al. . |
| 4,893,259 | 1/1990 | Grosser et al. . |
| 5,127,005 | 6/1992 | Oda et al. .......................... 395/183.02 |
| 5,243,546 | 9/1993 | Maggard . |
| 5,341,206 | 8/1994 | Pittaro et al. . |
| 5,347,475 | 9/1994 | Taylor et al. . |
| 5,357,336 | 10/1994 | Ruhl, Jr. et al. . |
| 5,442,555 | 8/1995 | Reifman ............................. 364/431.01 |
| 5,459,677 | 10/1995 | Kowalski et al. . |

FOREIGN PATENT DOCUMENTS

| | | |
|---|---|---|
| 0175537 | 3/1986 | European Pat. Off. . |
| 0 414 256 A1 | 2/1991 | European Pat. Off. ......... G21C 17/00 |
| 0 482 523 A2 | 4/1992 | European Pat. Off. ......... G05B 23/02 |
| 0560006 | 9/1993 | European Pat. Off. . |
| 1415867 | 12/1990 | U.S.S.R. . |
| 07275 | 4/1992 | WIPO . |
| 03341 | 2/1993 | WIPO . |

OTHER PUBLICATIONS

Yoji Takizawa et al An Intelligent Man–Machine System For Future Nuclear Power Plants Nuclear Technology Jul. 94, pp. 72–82.

American Chemical Society, Anal. Chem. 1991, 63, 2750–2756 Wang et al. "Multivariate Instrument Standardization".

American Chemical Society, Anal. Chem. 1992, 64 562–564 Wang et al. "Improvement of Multivriate Calibration through Instrument Standardization".

American Chemical Society, Anal. Chem. 1993, 65, 1174–1180 Wang et al. "Standardized os Second Order Instruments".

Soc. for Applied Spectroscopy, 1992, vol. 46, No. 5, 764–771 Wang et al. "Calibrahion Transfer and Measurement Stability of Near–Infrared Spectrometers".

(List continued on next page.)

*Primary Examiner*—Thomas R. Peeso
*Assistant Examiner*—Cuong Nguyen
*Attorney, Agent, or Firm*—Finnegan, Henderson, Farabow, Garrett & Dunner, L.L.P.

[57] ABSTRACT

Determined results of which measured data of a plant is normal/abnormal are mapped to a plant model in an abstract function level hierarchically represented with flow structures of mass/energy and goals to be accomplished by the respective flow structures so as to detect a failure propagation network. In the failure propagation network, a flow structure at the lowest hierarchical level of a network with a top goal of the highest priority is selected as an object to be diagnosed first. In other words, flow structures that are functionally important and close to the origin of anomaly are preferentially diagnosed. The diagnosis for flow structures detects abnormal elements through hypothesis and test. The abnormal element are evaluated with respective mass/energy balances or the like. With respect to the evaluated result, the origin of failure is inferred based on the rule of experience. When the abnormal element has a detailed flow structure, it is diagnosed. Thus, an abnormal position can be detected in more detail.

28 Claims, 9 Drawing Sheets

OTHER PUBLICATIONS

Yoji Takizawa et al., "An Intelligent Man–Machine System for Future Nuclear Power Plants", Nuclear Technology, vol. 107, pp. 72–82, Jul. 1994.

M. Lind et al. "Applications of Multilevel Modeling", ANP'92, Proceedings, Vol. IV, pp. 42.3-1–42.3-10, Oct. 25–29, 1992.

Anne M. Bisantz et al., "Making the Abstraction Hierarchy Concrete", Int. J. Human–Computer Studies, 40, pp. 83–117, 1994.

T. Forster et al., "Hierarchische, funktionsbezogene Dokumentationsund Planungs–Methode für die Prozesseittechnik," Automatisierungstechinische Praxis—ATP, vol. 30, No. 8, 1988, pp. 365–374.

Franz Perschl, et al., "Ein Überwachungssystem zur Fehlerdiagnose in verfahrens–technischen Anlagen," Automatisierungstechnische Praxis—ATP, vol. 38, No. 1, Jan. 1, 1996, pp. 45–51.

Q.Xia et al., "Integrated Intelligent Control System for Peroxide Bleaching Processes," Proceedings of the IEEE Conference on Control Applications, vol. 2, Sep. 13, 1993, Canada, pp. 593–598.

J. Lopez et al., "A Methodological Framework For Modelling Complex Technical Marine Systems For Diagnonstic Purposes," Intelligent Systems Engineering, Sep. 5, 1994, UK, pp. 298–303.

Yu–Shu Hu, et al., "Evaluating System Behavior Through Dynamic Master Logic Diagram (DMLD) Modeling," Proceedings of the Topical Meeting on Computer–Based Human Support Systems:Technology, Methods, and Future, Jun. 25, 1995, USA, pp. 218–224.-

FIG. 5

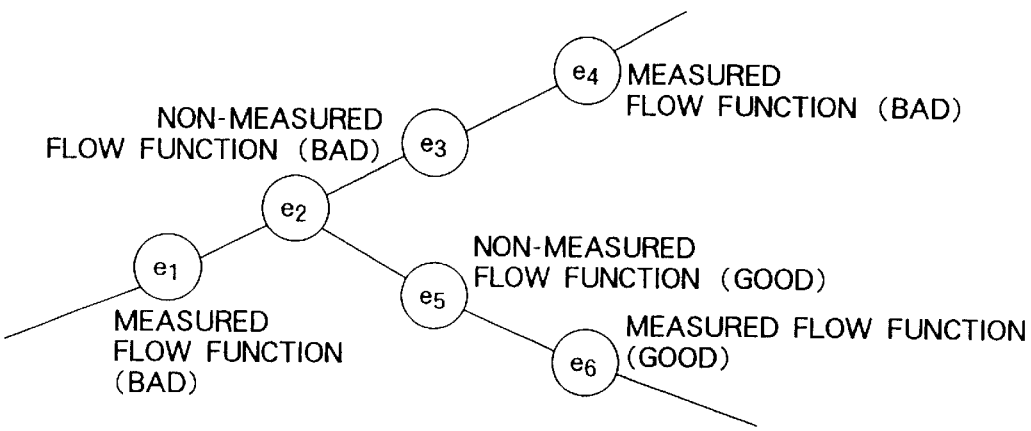

FIG. 6

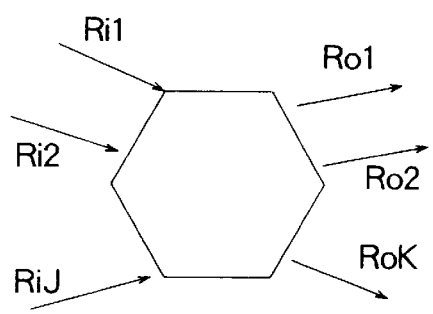

$$\left| \sum_{j=1}^{J} Rij - \sum_{k=1}^{K} Rok \right| < \varepsilon \quad \text{MONITORING BALANCE}$$

$$\left| \frac{Rij}{\sum_{j=1}^{J} Rij} - \alpha_j \right| < \varepsilon_j \quad \text{MONITORING DISTRIBUTIVE RATIO}$$

$$\left| \frac{Rok}{\sum_{k=1}^{K} Rok} - \alpha_k \right| < \varepsilon_k \quad \text{MONITORING DISTRIBUTIVE RATIO}$$

$\alpha$ : DISTRIBUTIVE RATIO    $\varepsilon$ : LIMITED VALUE

FIG. 7

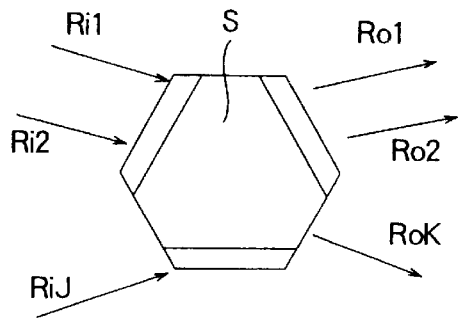

$|S - S_0| < \varepsilon_0$    MONITORING STORED MASS $\left| \dfrac{ds}{dt} - \beta \left( \sum\limits_{j=1}^{J} Rij - \sum\limits_{k=1}^{K} RoK \right) \right| < \varepsilon$    MONITORING BALANCE S : STORED MASS      $\beta$ : COEFFICIENT

FIG. 8

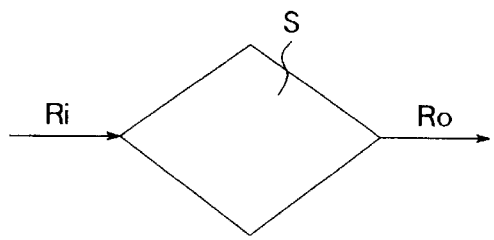

$|Ri - Ro| < \varepsilon$         MONITORING BALANCE $|Ri - Rio| < \varepsilon_j$        MONITORING NORMAL VALUE $|Ro - Roo| < \varepsilon_o$       MONITORING NORMAL VALUE $|f(S, Ri, Ro)| < \varepsilon_f$    MONITORING RESTRICTED CONDITION

S : STATE AMOUNT OF DRIVE SOURCE

Ri > 0     Ro > 0        MONITORING ONE DIRECTION

|Ri| < ε   |Ro| < ε      MONITORING TWO DIRECTIONS

METHOD AND APPARATUS FOR DIAGNOSING PLANT ANOMALY

BACKGROUND OF THE INVENTION

1. Field of the Invention

The present invention relates to a method and an apparatus for diagnosing a plant using a plant model in an abstract function level based on a human cognitive process so as to support countermeasures and decisions of an operator of the plant against an anomaly thereof.

2. Description of the Related Art

In the operation of a large-scaled, complicated industrial process plant such as a nuclear power plant and petrochemical plant, even a tiny malfunction in a local region of the plant should be early detected and proper countermeasures should be taken so as to prevent the malfunction to propagate to the entire plant, and keep plant operation safe and economical. Thus, a large number of instruments for monitoring plant operational states have been installed and alarm generating functions have been provided to most of them so as to rapidly detect such a malfunction or anomaly.

However, it is difficult for the operators to rapidly and properly take countermeasures against many alarms. In addition, it is not practical to measure and monitor the states of all elements of the plant.

To solve such a problem, a variety of plant diagnosing apparatuses that diagnose operating states of plants corresponding to measured signals of these plants and support monitoring/diagnosing operations of the operators have been developed. In a typical example of such apparatuses, all anomalies that may take place are assumed beforehand and transient change patterns of typical plant state amounts for such anomalies are stored beforehand. When plant transients take place, they are compared with the stored patterns so as to detect the type of the anomaly. A diagnosis using a neural network can be considered as a method of which typical patterns are stored in connections of the neuron network.

In a large-scaled complicated plant, various abnormal events take place. Thus, it is difficult to prepare progress patterns of these events beforehand. In addition, even if such an event takes place, it differs from a pre-considered pattern in details. Many cases in other fields show that a serious trouble often results from many troubles that unexpectedly take place at a time.

In addition, since the operational staff should make the final decision with reference to the output from the plant diagnosing apparatus, the diagnosing process thereof should be fully understood by them. However, the human cannot memorize a huge number of combinations of the causes of anomalies and the indications for the consequence. Accordingly, from past examples of medical expert systems, it can be easily estimated that the operator cannot adequately understand the output from the plant diagnosing apparatuses.

SUMMARY OF THE INVENTION

Therefore, an object of the present invention is to provide a method and an apparatus for diagnosing all abnormal events of a large-scaled complicated plant.

Another object of the present invention is to provide a method and an apparatus for diagnosing anomalies of a plant with a user-friendly inference process.

Another object of the present invention is to provide a method and an apparatus for effectively inferring the cause of an anomaly in a limited region of which the probability of the origin of the anomaly is high.

Another object of the present invention is to provide a diagnosing method that can be applied to various plant processes and an apparatus thereof.

A first aspect of the present invention is a method for diagnosing a plant anomaly corresponding to measured data supplied from the plant, the method comprising the steps of sampling the measured data, determining whether or not the state of each function of the plant is normal corresponding to the sampled data, and inferring an origin of the plant anomaly with a plant model in an abstract function level represented by a flow function corresponding to information obtained in the measured data determining step. Flow function means a control function which controls mass and energy flow in a process plant. A typical process plant is represented by a combination of six flow functions such as source, storage, distribution, transport, barrier and sink in the abstract functional level.

A second aspect of the present invention is an apparatus for diagnosing an anomaly of a plant corresponding to measured data supplied from the plant, comprising means for storing a plant model hierarchically representing function of the plant in an abstract function level, measured amount determining means for obtaining a state amount related to the plant model corresponding to the measured data and comparing the state amount with a threshold thereof so as to determine whether or not the state amount is normal, means for inferring an origin of the anomaly of the plant using the plant model corresponding to information supplied from the measured amount determining means, and a display unit for displaying an inference process and result supplied from the inferring means, wherein the inferring means includes means for determining whether or not a functional state of each model element is normal downward from the upper model element in a hierarchy of the plant model based on the information supplied from the measured amount determining means, the model elements hierarchically structuring the plant model, and means for detecting a failure propagation network composed of a model element determined as abnormal.

According to the present invention, the following effects can be accomplished.

(1) Since a plant model used for the diagnosis is based on a normal plant function rather than a particular anomaly, the diagnosis does not stop with an unexpected event.

(2) Since plant model based on the human cognitive process is used, even if a large-scaled complicated plant is diagnosed, the model can be simplified so that he or she can handle them. Thus, the operator can easily understand the inferred results.

(3) The alteration of the plant model enables its application for various processes and the plant model can be easily modified according to the plant process change.

These and other objects, features and advantages of the present invention will become more apparent in light of the following detailed description of a best mode embodiment thereof, as illustrated in the accompanying drawings. In the drawings, similar elements are denoted by similar reference numerals.

BRIEF DESCRIPTION OF DRAWINGS

FIG. 5 is a schematic diagram for explaining a bad element determining method using paths of failure propagation in a flow structure of a plant model;

FIG. 6 is a schematic diagram for explaining a failure determining method of a balance function in a flow structure;

FIG. 7 is a schematic diagram for explaining a failure determining method of a storage function in a flow structure;

FIG. 8 is a schematic diagram for explaining a failure determining method of a transport function in a flow structure;

DESCRIPTION OF PREFERRED EMBODIMENTS

Figure 1:
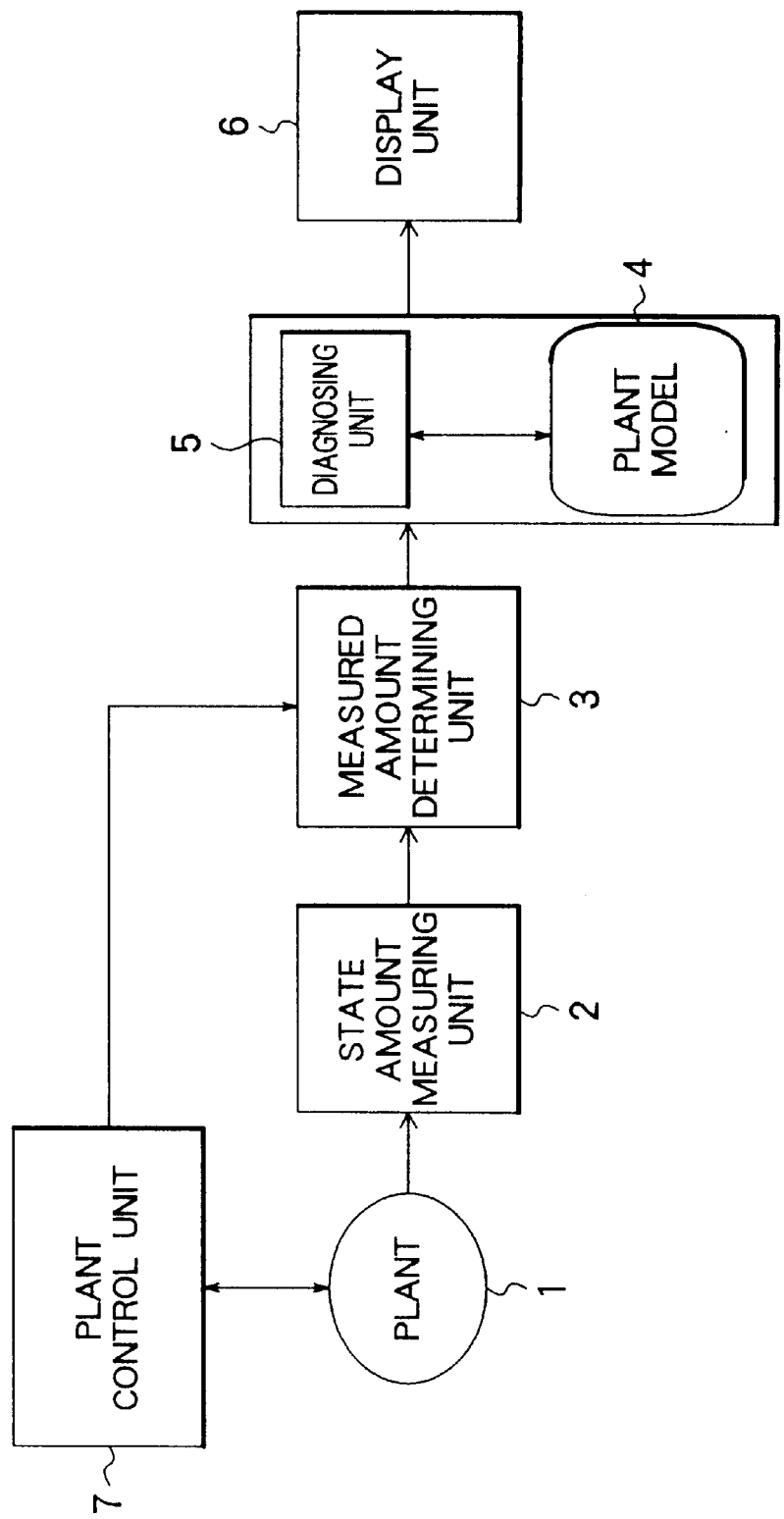
FIG. 1 is a block diagram showing a plant diagnosing apparatus according to an embodiment of the present invention.

FIG. 1 is a block diagram showing a plant diagnosing apparatus according to an embodiment of the present invention. The plant diagnosing apparatus comprises a state amount measuring unit 2, a measured amount determining unit 3, a plant model 4, a diagnosing unit 5, and a display unit 6. The state amount measuring unit 2 measures each state amount of the plant 1. The measured amount determining unit 3 determines whether or not each measured amount supplied from the state amount measuring unit 2 is normal. The diagnosing unit 5 diagnoses the plant 1 using the plant model 4 corresponding to the determined result of the measured amount determining unit 3. The display unit 6 displays diagnosed information supplied from the diagnosing unit 5. Normally, the measured amount determining unit 3 and the diagnosing unit 5 are accomplished by software that runs on a process computer or a workstation. The plant control unit 7 controls the start/stop operation of the plant 1 and the output thereof corresponding to the operation schedule. The operation schedule is used for adjusting the determining reference of the measured amount determining unit 3.

The plant model 4 in the diagnosing unit 5 is composed of many flow stuctures to be diagnosed in an abstract funtional level. In a human cognitive process when the operator solves a problem that has taken place in a large-scaled complicated system such as an industrial process plant, it has been known that the plant system is modeled at different levels of abstraction (along the axis of end-means). These abstract levels form a hierarchical structure. The highest level is the purpose/goal of the plant. For example, in a power plant, the purpose of the plant is electricity generation and safety. The next lower level is the abstract function. The abstract function is represented by the flow of mass, energy, information, or the like. The lower levels are the generalized function and the physical function in order of height. The lowest level is the most realistic level that is the physical form.

The reason why the plant system is modeled at various abstract levels in the human cognitive process is because the region to be diagnosed is narrowed at highly abstract levels, so it becomes easy to diagnose at lower detailed function levels in the limited region. Thus, the cause of anomaly can be effectively inferred by the brain of a human as a limited resource.

The plant model 4 used in the plant diagnosis of the present invention is equivalent to the abstract function level in the abstract hierarchical structure, in which the plant function is represented by flows of mass and energy. In the case of a power plant, energy is an output as the purpose. In another plant, the storage of energy should be considered for safety. These flows can be represented by functional elements such as source, sink, storage, transport, balance, and barrier. The mass/energy balance of each element is a rule that governs such flows and used for an inference.

Flow structures represented by a network of these elements are hierarchically linked and thereby it can be considered that the flow structures compose a large-scaled complicated industrial process plant.

Figure 2:
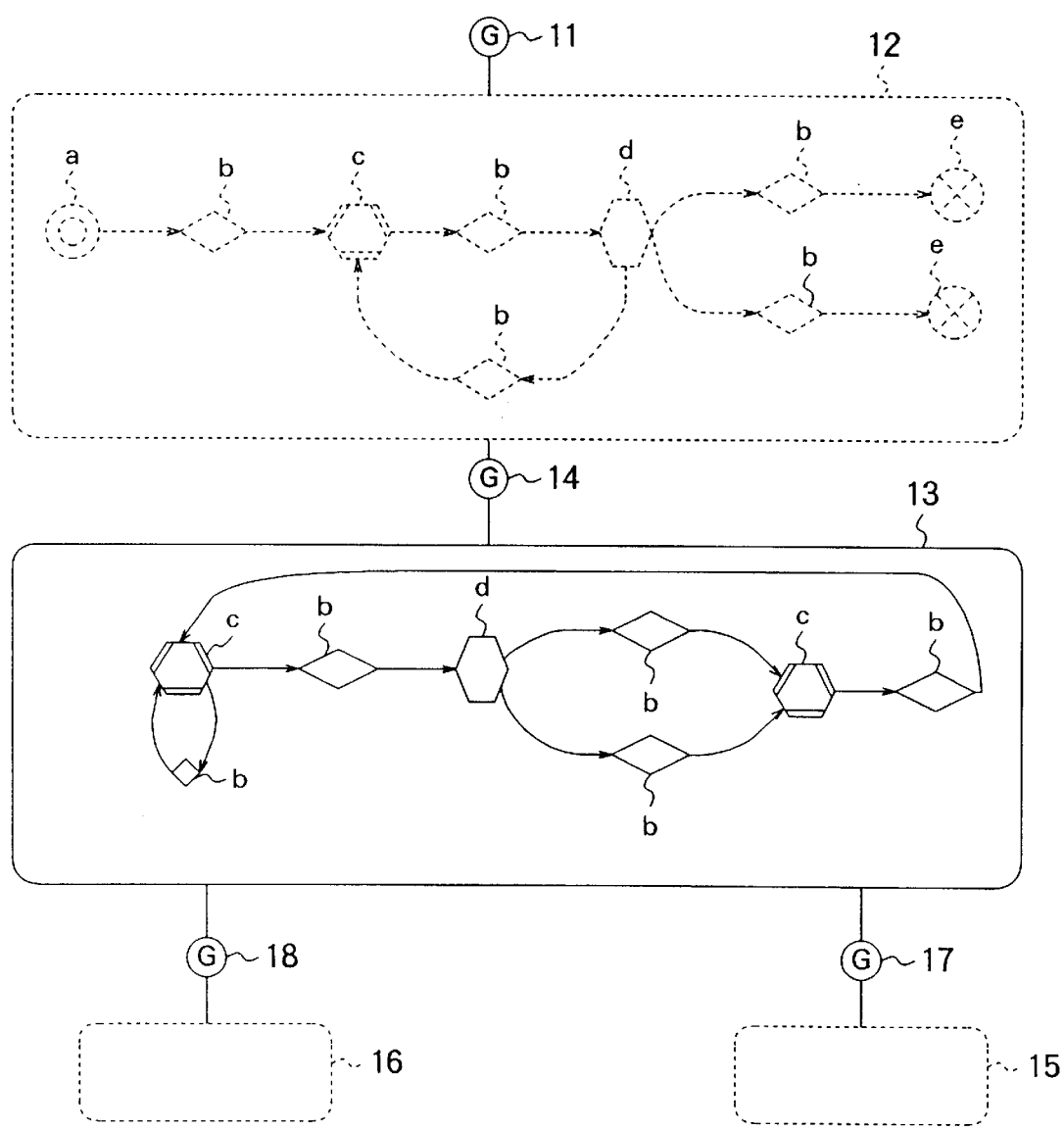
FIG. 2 is a schematic diagram showing a plant model in an abstract function level used in the plant diagnosis according to the present invention.

Next, as the plant 1 to be diagnosed, a BWR (Boiling Water Reactor) type nuclear power plant will be exemplified. In the BWR type nuclear power plant that is composed of a core, a recirculation system, a feed water /condensate system, a main steam system, a turbine/generator system, and so forth, the electricity generation is the goal to be accomplished. As shown in FIG. 2, it is considered that the flow of energy that is heat generating/converting process for maintaining the goal 11 is the uppermost flow structure 12 of the plant.

To accomplish the process of the flow of energy, the flow of coolant as a carrier for energy (namely, the flow of mass) is essential. In FIG. 2, the flow of mass is represented by a flow structure 13. The purpose of the flow structure 13 is to maintain the function of the uppermost flow structure 12 of the heat generating/converting process. Thus, as shown in FIG. 2, the flow structures 12 and 13 are linked with a goal 14. The goal 14 is a goal of the flow structure 13. On the other hand, the goal 14 is a condition for maintaining the function of the uppermost flow structure 12.

In addition, to accomplish the transport function of the flow of mass in the flow structure 13, flow structures 15 and 16 of pump driving energy are required. The flow structures 15 and 16 are linked to the higher flow structure 13 with goals 17 and 18, respectively. It is clear that more flow structures (not known) are required to maintain the functions of the flow structures 12, 13, 15 and 16.

Figure 3:
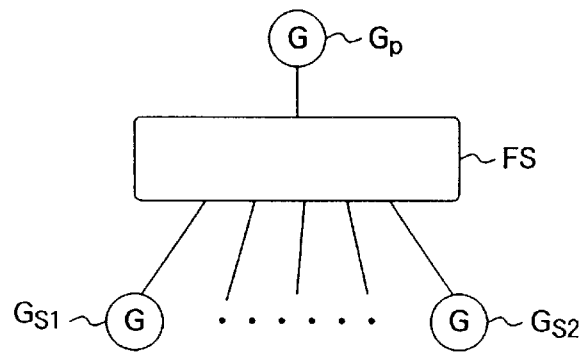
FIG. 3 is a schematic diagram showing a basic element composing the hierarchy of a flow structure of a plant model.

As a basic element that composes the hierarchy of a flow structure, a structure shown in FIG. 3 is considered. In FIG. 3, a goal $G_p$ is a goal of a flow structure FS. The lower goals $G_{s1}$ and $G_{s2}$ represent conditions for maintaining the flow structure FS (there are more goals depending on the flow structure). In other words, the plant model 4 is composed of a combination of many basic elements.

In the flow structures 12, 13, 15 and 16 shown in FIG. 2, dotted lines represent flows of energy, whereas solid lines represent flows of mass. Letters a, b, c, d, and e represent source, transport, storage, balance, and sink elements, respectively.

It is considered that a failure that took place at any functional element of the plant affects neighboring elements.

However, in the plant model 4 represented as a hierarchy of flow structures, it is considered that a failure propagates upward from the lower hierarchical level to the higher hierarchical level. Thus, when the plant anomaly are monitored from the highest hierarchical level corresponding to the plant model 4, failures are detected in the order of importance. Consequently, since countermeasures against the failures can be easily taken, it is remarkably efficient to keep the plant economical and safe.

Thus, the measured amount determining unit 3 calculates the state amount corresponding to each goal and each flow structure of the plant model 4 based on various measured amounts supplied from the state amount measuring unit 2 and determines whether or not the state amount is normal corresponding to a predetermined threshold value. With the determined result, the diagnosing unit 5 investigates the hierarchy of the plant model 4 downward from top to determine the order of diagnosis for the disturbed flow structures.

The diagnosing unit 5 can almost determine the hierarchical relation between goals corresponding to the hierarchical structure of the plant model 4. However, generally, there are a plurality of purposes (safety, activity rate, and so forth). Thus, each goal is assigned a priority level beforehand. As the order based on the priority of each goal, the process order for each basic element shown in FIG. 3 is assigned. Then, a network in consideration of propagation of a failure is detected as the failure propagation network on the plant model 4.

In the basic element shown in FIG. 3, the states of all elements in the flow structure FS cannot be measured (including calculated values based on measured values). In other words, the states of part of elements cannot be measured. When a failure propagation network is detected, an element whose state cannot be measured is treated as abnormal.

For example, in FIG. 3, when the state of a goal $G_P$ is normal, it is not included in the failure propagation network. Otherwise, it is included in the failure propagation network. Next, in the flow structures FS, even if one of measured amounts of elements shows anomaly state, the flow structure FS is regarded as abnormal and included in the failure propagation network. When the flow structure FS does not have a measured value, the flow structure FS is included in the failure propagation network. When the flow structure FS is abnormal, the state amounts of the goals $G_{s1}$ and $G_{s2}$ linked to the flow structure FS are considered and the same process as the goal $G_p$ is performed for the goals $G_{s1}$ and $G_{s2}$. Even if the flow structure FS is normal, since the goals $G_{s1}$ and $G_{s2}$ are investigated as top goals of the basic elements corresponding to the priorities thereof, when the above-described process is performed for all goals, the failure propagation network of the plant 1 can be detected.

Next, the order of diagnosis for the flow structures is determined based on the failure propagation network. Since it is considered that the detected failure propagation network is composed of plural small failure propagation networks the priority order of the flow structures is determined as follows.

Figure 4:
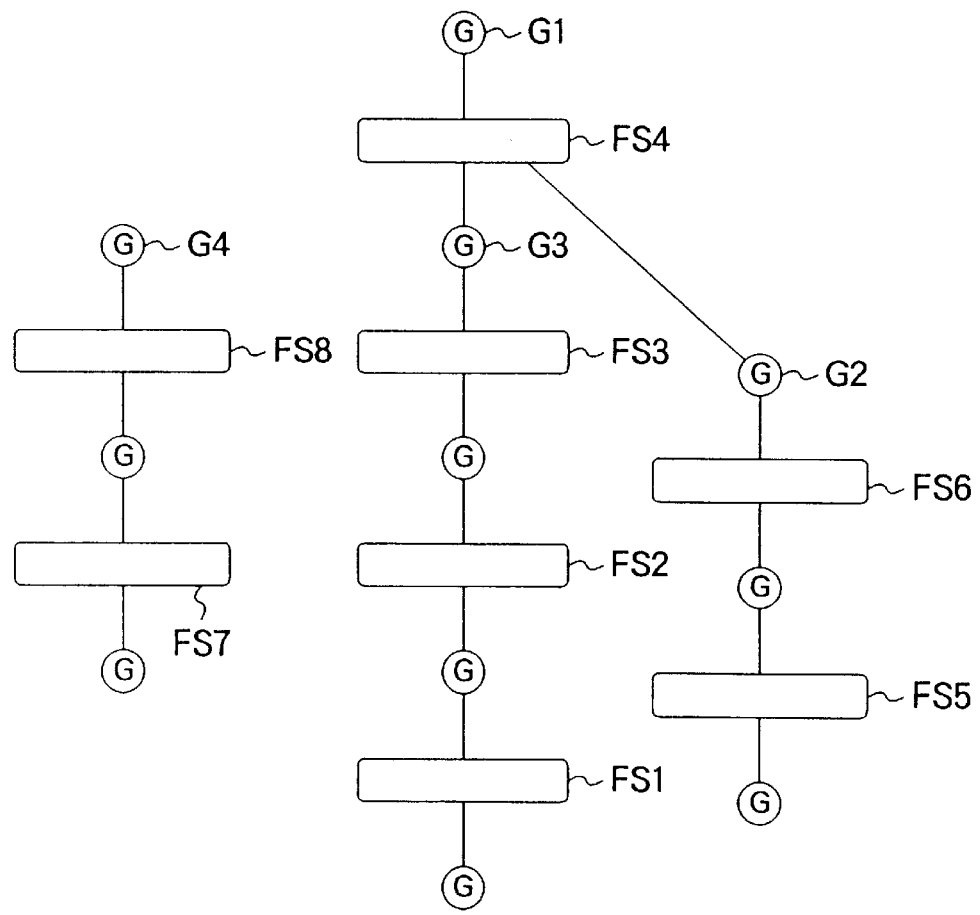
FIG. 4 is a schematic diagram showing an example of a failure propagation network detected from a plant model.

In a failure propagation network shown in FIG. 4, a separated network linked to a goal $G_1$ with the highest priority of all goals is selected. From the lowest flow structures of the selected network, a flow structure FS1 including a state amount determined as abnormal by the measured amount determining unit 3 is selected and assigned the first order of the diagnosis. Next, flow structures FS2 and FS3 linked to the flow structure FS1 are assigned the second and third orders of the diagnosis, respectively.

As shown in FIG. 4, the flow structure (FS4) may be linked to a plurality of goals (G2 and G3). In this case, the priority of the goal G2 is compared with the priority of the goal G3. The goal with the higher priority is selected. Here, the priority of the goal G3 is higher than that of the goal G2. Thus, the failure detecting process is performed in the order of the flow structures FS1, FS2, FS3, FS5, and FS6.

Next, for another network linked to a top goal G4 with the lower priority than the top goal G1 orders of flow structures FS7 and FS8 are determined as described above.

Thereafter, the diagnosing unit 5 starts to diagnose the flow structure with the first order to identify abnormal elements corresponding to the determined orders. In a flow structure represented by a network of elements of flow functions, the states of all elements cannot be measured. Generally, it can be considered that part of elements can be measured. Thus, the measured amount determining unit 3 determines part of measured elements as abnormal elements and the rest as normal elements. The resultant data is supplied to the diagnosing unit 5. The diagnosing unit 5 determines whether or not each element of the flow structure to be diagnosed is normal corresponding to the data supplied from the measured amount determining unit 3.

First, it can be assumed that in a network of elements in a flow structure, a failure propagates to a not-measured element linked to a measured element determined as abnormal by the measured amount determining unit 3. However, in this failure propagation, if a measured element determined as normal is encountered on the failure propagation path, this assumption is not proper. Thus, this hypothesis should be withdrawn to an element that satisfies a proper reason of the hypothesis. For example, as shown in FIG. 5, when the failure propagation path reaches to a measured element (flow function) e4 determined as abnormal (bad) through elements e2 and e3 from a measured element e1 determined as abnormal, it can be assumed that the elements e2 and e3 are abnormal elements as the failure propagation. However, if the branch from the element e2 reaches to a measured element e6 determined as normal (good) through an element e5, the element e5 should be assumed as a normal element. One of reasons is that in consideration of the flow, it is considered that a failure of each element appears as anomaly of the entire path (circuit) consisting of the each elements.

Thus, the diagnosing unit 5 searches all paths linked from any abnormal elements to other abnormal elements not through normal elements corresponding to the results of a group of measured element determined as normal or abnormal. With a flow structure model, the failure propagation paths can be searched by software.

The diagnosing unit 5 diagnoses each element determined or assumed as abnormal (bad) in the failure propagation process corresponding to mass balance/energy balance for each element and narrows or detects failed flow functions in the assumption that a failure of one of all elements that composes a flow structure disturbs the flow of the entire flow structure and is detected as an anomaly of the entire group of elements.

First, the state amount of each element is estimated using the state amounts of a set of elements determined or assumed as normal elements. In other words, the same process as the failure propagation can be applied for the estimation of the state amounts. For a state amount to be obtained (for example, an input flow rate of an element A), a state amount of an element linked thereto (in this case, an output flow rate of an element B linked to the element A) is searched. If this state amount of the element B is unknown, a state amount of an element further linked to the element B is searched. Since the searching process is limited to normal elements, mass/energy balance can be applied for the estimation of state amounts. In other words, when only one flow amount of an element is unknown, it can be obtained due to the fact that sum=0.

Next, state amounts are estimated between abnormal 25 elements by propagation of state amounts as mentioned above. In this case, since it is assumed that elements are abnormal, mass/energy balance cannot be directly applied. Thus, state amounts of element that have been estimated are used for estimating state amounts of other elements so that the estimation of state amounts can be accelerated. In such a manner, elements whose state amounts have been estimated are determined whether or not they are normal corresponding to flow functions thereof.

For example, with respect to a balance element, as shown in FIG. 6, it is determined whether or not the input flow rate and the output flow rate are unbalanced. In addition, the respective distribution ratio of the input flow rate and the output flow rate is determined.

With respect to a storage element, as shown in FIG. 7, the same determinations for input flow rate and output flow rate as a balance element are performed. In addition, the stored mass is determined. Moreover, it is determined whether or not a restriction of the conservation law between the time change rate of the stored amount and unbalanced flow rate is satisfied.

A transport element relates to a drive force of a flow and physically corresponds to a pump or the like. As shown in FIG. 8, when there are measured signals related to incoming/outgoing flow rates, a flow rate unbalance therebetween, and the drive force, it is determined whether or not the element satisfies the restriction between the drive force and the flow rate (the characteristic of the performance of the pump and so forth).

Figure 9:
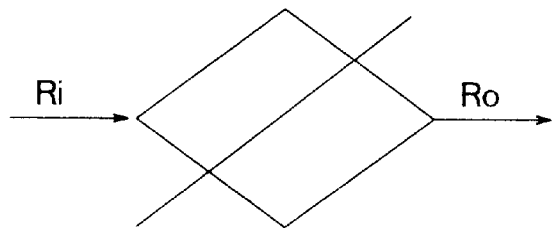
FIG. 9 is a schematic diagram for explaining a failure determining method of a barrier function in a flow structure.

With respect to a barrier element, as shown in FIG. 9, there are two cases. In one case, a flow is permitted in one direction as with a check valve. In the other case, a flow is shut out in both directions as with an isolation valve. Thus, the barrier element should be determined in each case.

An element whose state amounts have not been properly estimated is kept abnormal.

The diagnosing unit 5 implants a general decision of the operator to a knowledge information processing system (expert system) so as to enhance the support of the operator. The knowledge used in this system is obtained through the experience of the operator. Thus, the knowledge depends on each industry plant. However, in a diagnosis in the abstract function level, for example, a transport element, even if a measured amount of each flow rate is abnormal, as long as the restriction between the drive force and the flow rate is satisfied, the element is determined as a normal element. With respect to a storage element, as long as the restriction of conservation law between the time change rate of stored mass and the flow rate unbalance is satisfied, the element is determined as a normal element. With respect to a balance element, it is difficult to define such a preferential restriction. However, it is considered that an unbalance between incoming flow rates and outgoing flow rates is more important than the violation of the restriction of the distribution ratio. However, an error of the distribution ratio may relate to an error of efficiency of the element. These knowledge is based on the fact that a failure of one element of a flow circuit propagates to the entire circuit, as described above.

On the other hand, in the case that there is an element whose state amounts have not been collected and thereby determined as an unknown element, since it may be considered that the element was divided into small portions against a measured point, a determination may be performed for an integrated case. In the case that a plurality of circuits or elements of the same type are present and detailed state amounts thereof are individually unknown, as a general determination rule, the known typical state amounts can be compared so as to detect an abnormal circuit or an abnormal element.

As a result of the general determination, when an element regarded as an abnormal element cannot be finally determined as an abnormal element and thereby a contradictory result takes place, it can be considered that the probability of which the determination of any element is incorrect is high. As a cause, it can be considered that, for example, a non-measured element may be assumed as a normal element due to the relation of linkage of elements of a flow structure of the plant model 4, or a correct state amount has not been measured (for example, a failure of an instrument).

In such a case, the diagnosing unit 5 performs one of the following processes. As one process, the diagnosing unit 5 temporarily assumes that an element adjacent to an element that has been determined as an abnormal element by the measured amount determining unit 3 is abnormal and determines elements on the paths that link between abnormal elements not through normal elements as abnormal elements. The diagnosing unit 5 obtains the state amounts of each element determined as an abnormal element corresponding to the method of the above-described state amount propagation. With the obtained state amounts, the diagnosing unit 5 determines whether each element is normal corresponding to the mass/energy balance of the element or the other restriction between state amounts. When necessary, the diagnosing unit 5 performs a general determination of the resultant based on rule-base diagnosis corresponding to the human general determination.

As another process, the diagnosing unit 5 obtains the state amount of each element assumed as a normal element corresponding to the linkage between elements by applying the method of the above-described state amount propagation. With the obtained state amount, the diagnosing unit 5 determines whether or not each element is normal corresponding to the mass/energy balance or the other restriction between state amounts. When necessary, the diagnosing unit 5 generally determines about the resultant corresponding to rule-base diagnosis based on the human general determination.

As a further other process, since it can be considered that a correct measured amount has not been obtained (due to failure of the instrument) as a cause of contradictory result, the diagnosing unit 5 assumes that in the measured elements determined as normal by the measured amount determining unit 3, the measured element most close to an element determined as abnormal by the measured amount determining unit 3 may have an abnormal state amount and that elements on paths linking from the element assumed as abnormal to other abnormal elements not through normal element is abnormal. Next, the diagnosing unit 5 obtains the state amounts of each element newly determined as abnormal. With the state amounts, the diagnosing unit 5 determines whether or not each element is normal corresponding to mass/energy balance or the other restriction between state amounts. When necessary, the diagnosing unit 5 generally determines about the resultant corresponding to rule-base diagnosis based on the human general determination.

In the BWR type nuclear power plant, the state amount measuring unit 2 measures a reactor output, a reactor vessel pressure, a main steam flow rate, a generator output, a feed water temperature, a core flow rate, a re-circulation pump flow rate, jet pump flow rates, feed water/condensate flow rates, pump discharge pressures, a reactor water level, a condenser water level, and so forth. The function of the measured amount determining unit 3 is to obtain the state amounts (goal achievement degree, mass/energy flow, stored amount, and so forth) of elements of the plant model 4 corresponding to measured signals supplied from the state amount measuring unit 2 and to supply the results to the diagnosing unit 5. The measured amount determining unit 3 evaluates each goal corresponding to an evaluation function for evaluating achievement degrees thereof so as to determine whether or not each goal is normal. In addition, the measures amount determining unit 3 compares state amounts of the other elements with respective predetermined threshold values corresponding to values in the normal state so as to determine whether or not each state amount is normal (good). The determined result is supplied to the diagnosing unit 5. When the plant is in start-up or shut-down phase, the plant control unit 7 varies the positions of control rods, a core output, a feed water/condensate flow rate, and so forth so as to adjust the pressure of the reactor vessel, the generator output, and so forth. The measured amount determining unit 3 obtains a planned operation schedule such as a plant start-up plan and plant load variation data from the plant control unit 7. Thus, the measured amount determining unit 3 varies the standard values of relevant state amounts of the plant model 4 and the threshold values used for good/bad determination corresponding to the time change of the operational state of the plant so as to prevent incorrect determination in the planned plant operational change.

The diagnosing unit 5 is given the plant model 4 in an abstract function level and the priority of each goal and inputs the state amount of each model element (a goal and a flow structure) from the measured amount determining unit 3. Then, the diagnosing unit 5 detects a failure propagation network on the plant model 4 and starts diagnosis for identifying an abnormal portion from the flow structure most close to the origin of an anomaly.

A major purpose in the normal operation of the nuclear power plant is to generate electricity. However, in the plant transient and the like, if the reactor tripped, the major purpose thereof is to remove residual heat. Thus, the plant model 4 should have been prepared to correspond to such two purposes. After the reactor is tripped, the priority of the goal of heat-removal operation should be increased. In other words, goal priorities are varied corresponding to the situation. For example, in any operation state, when the redundancy of a system that performs a particular function decreases, the priority of the goal of the function is increased so as to enhance the monitoring and diagnosis for the system.

Thus, the measured amount determining unit 3 inputs a plant control signals from the plant control unit 7, and, when a safety unit issues a trip signal, adjusts the priorities of goals in such a manner that the priorities of the goals related to the normal operation are decreased and the priorities of the goals related to the residual heat removal operation are increased. The measured amount determining unit 3 further has the function to output the priorities of the goals to the diagnosing unit 5.

In addition, the plant model 4 has decomposed or detailed flow structures of major elements of the flow structures. If the probability of which one of the major elements is abnormal is high, the diagnosing unit 5 then diagnoses the relevant detailed flow structure. Thus, when it is determined that the probability of the failure of an element of a particular flow structure is high, before diagnosing the upper flow structure, it diagnoses a detailed flow structure thereof.

The reasons why the detailed flow structures are processed independently from the failure propagation networks are:

(1) If a plant model that incorporates all detailed flow structures is used for searching failures, the complexity of the model increases and thereby the diagnosing time increases.

(2) Generally, since an anomaly takes place at the local of the plant model, when a large model is handled, the efficiency deteriorates.

(3) A detailed flow structure model may be newly added through the experience of an abnormal event. If the entire plant model is updated whenever a detailed flow structure is added, large labor is required and mistakes may take place.

On the other hand, in the method for adding a model of a detailed flow structure, a detailed model is added outside the corresponding element of a basic model as shown in FIG. 2. Thus, the basic model is not largely changed. In addition, when necessary, a more detailed model of which a major element of the added detailed model are further decomposed can be added. Thus, the model can be easily expanded. Consequently, the experience of troubles can be usefully stored.

To accomplish a diagnosis for the detailed flow structure model, as with a diagnosis for the flow structure of a hierarchical plant model, the diagnosing order should be assigned so as to improve the efficiency of the diagnosis. Thus, assuming that the influence of a failure is reversely proportion to the distance thereof, abnormal elements in one flow structure are arranged in the order of the larger failure degrees.

For example, as the first severe failure, the flow reverse, the flow lost, the non-conservation of mass/energy balance of the storage may be considered. As the second failure, an unbalance of incoming/outgoing flow rates of each flow element (although this may be equivalent to the non-conservation of mass/energy balance, in consideration of a case due to a measurement error and a state amount estimation error, this failure is clearly categorized). As the third failure, a case of which the state amount (such as a flow rate and water level) of each flow element deviates from the standard value thereof can be considered. In the latter case, the order can be assigned corresponding to the value of deviation of (1-ratio of measured value and standard value). Because it can be considered that the normalized deviation value is reversely proportional to the distance from the origin of the failure, and the influence of the failure decreases in proportion to the distance thereof and equalized.

It is determined whether or not the abnormal elements assigned in such an order can be expanded into detailed flow structures. When the abnormal elements can be expanded into detailed flow structures, the detailed flow structures are diagnosed. As with the process of the diagnosis for the flow structures, abnormal elements are detected from the detailed flow structures. In addition, as the diagnosed result, if there are a plurality of abnormal elements, failure degrees are assigned and it is determined whether or not the detailed flow structures can be decomposed into more detailed flow structures. As long as a more detailed flow structure model is present, the origin of the failure can be narrowed and approached.

The diagnosing unit 5 may have a plurality of processing units that process a plurality of discrete networks of failure propagation (for example, G1 (including G3), G2, and G4 shown in FIG. 4) so as to process them in parallel.

Thus, when the difference of the priorities of G1 and G4 or that of G2 and G3 is small, the process of the flow structure FS7 can be prevented from remarkably delaying against the process of the flow structure FS1. Consequently, while the first processing unit is processing the flow structures that links G1 and G3, the second processing unit performs the flow structures that links G4 and the third processing unit performs the flow structures that links G2.

The display unit 6 displays the flow structures where failure occurs with the entire plant model 4 so that the operator can know the propagation range to the entire plant function and predict future propagation. In addition, the flow structure having the origin of failure is displayed with the failure propagation network that was detected. Thus, the operator can easily know the anomaly identifying process and the identified abnormal position.

Figure 10:
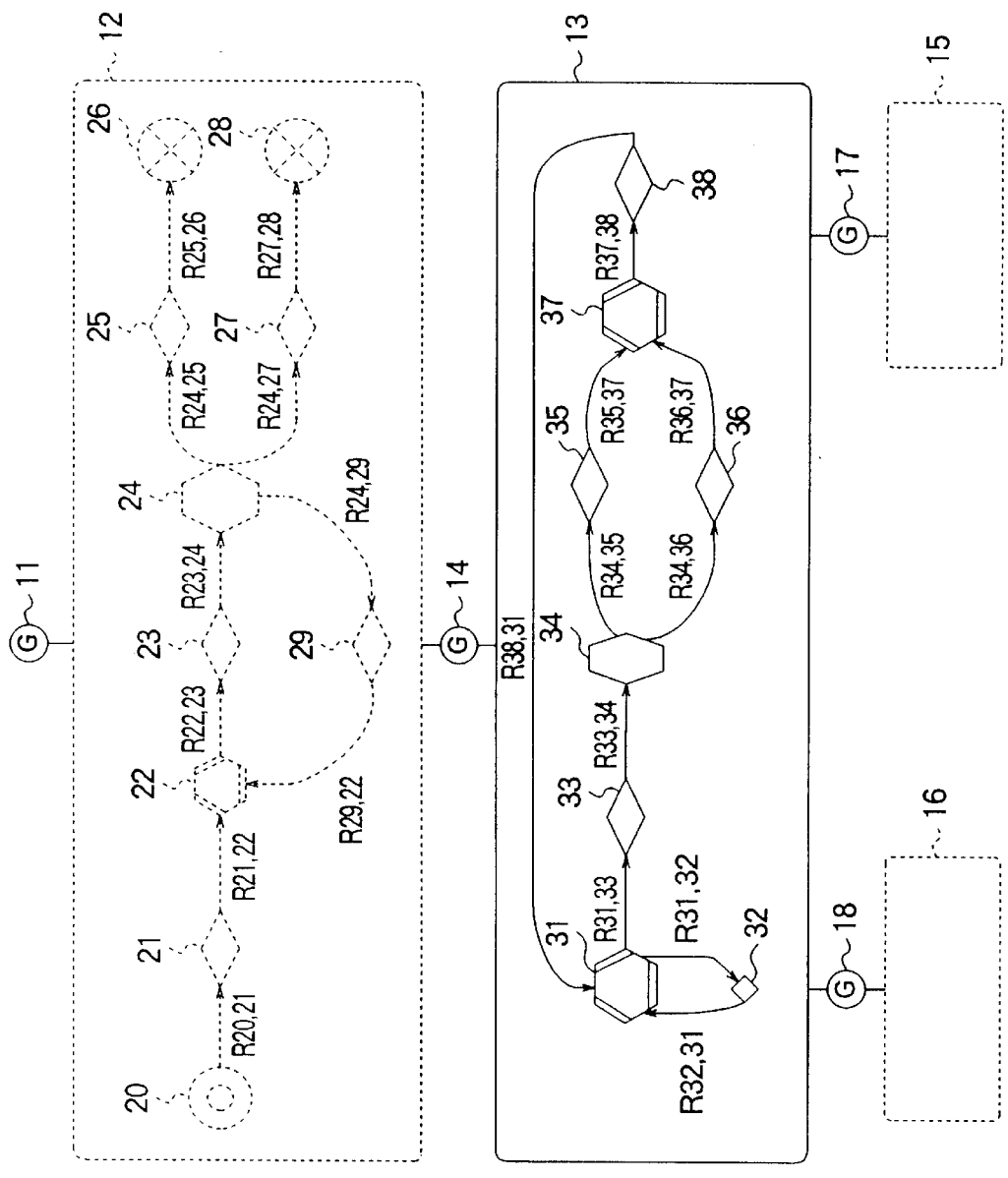
FIG. 10 is a schematic diagram showing a plant model of a BWR nuclear power plant used to explain an example of the plant diagnosis according to the present invention.

FIG. 10 shows an example of the plant model 4 of which a BWR nuclear power plant is represented in an abstract functional level. This plant model 4 is stored as a database in the diagnosing unit 5 and used to determine an anomaly. Flow structures 12 and 13 of the plant model 4 are the same as those shown in FIG. 2. In FIG. 10, each functional element is denoted by a unique reference numeral. A flow of energy or a flow of mass between elements is denoted by a letter R, an upstream element number, and a downstream element number.

Since a goal 11 represents an electricity generation, the accomplishment state thereof is determined by an output of a terminal of a generator. The goal 11 has the second highest priority. The highest priority is assigned to the maintenance of safety.

A flow structure 12 represents a flow of energy to attain the goal 11. Fission energy of a reactor core 20 that is a heat source function is transmitted to a coolant 21 that is a transport function and stored as steam energy in a reactor pressure vessel 22 that is an energy storage function. Energy in the reactor pressure vessel 22 is supplied to a steam turbine 24 by a main steam system 23 that is a transport function. The steam turbine 24 branches the energy into three ways. In the first way, the energy is converted from kinetic energy into electric energy and supplied to end users 26 through an electric grid 25. Since the end users 26 consume the energy, they are represented by a sink function. In second way, the energy is used as regenerative energy in a feed water heater 29 so as to improve the efficiency of the conversion process. Thereafter, the energy is returned to the reactor pressure vessel 22. In the third way, the rest of energy is dumped to the outside (normally, sea) that is a sink function as exhaust heat by a circulation water system 27.

In the energy flow structure 12, energy of nuclear fission of the core 20 is measured as average core output (APRM: Average Power Range Monitor). R20, 21 represents a flow of fission energy produced in the core 20 to the coolant 21. R20, 21 is the same as energy that is normally generated.

The heat transport function of the coolant 21 that cools the core 20 and thereby transports energy generated by fission is evaluated with a balance calculation (performed in the phase of a detailed failure diagnosis) and a restriction condition of a core flow rate as a measured value.

Part of heat energy transmitted to the coolant 21 is stored as steam (energy flow R21, 22) in the reactor pressure vessel 22 that is a storage function. As with R20, 21, energy R21, 22 cannot be directly measured. In the normal operation state, energy R21, 22 can be obtained by a calculation of the energy balance with a feed water flow rate, a feed water temperature, a main steam flow rate, and a reactor pressure.

The function of the reactor pressure vessel 22 that stores steam energy is evaluated with an input/output balance along with a reactor pressure that is a measured value. Energy R22, 23 that flows from the reactor pressure vessel 22 is measured as a main steam flow rate and a pressure. Incoming energy R29, 22 will be described later.

The function of the main steam system 23 that transfers steam energy is evaluated with a balance calculation and a steam flow rate at the entrance of the turbine that is a measured value. R23, 24 is calculated as a turbine entrance flow rate. However, when an energy balance is calculated in detail, enthalpy of steam should be calculated in combination with the entrance steam pressure.

The function of the steam turbine 24 is evaluated with a balance calculation of incoming energy and outgoing energy. In addition to the balance calculation, with a restriction condition of electric energy that is an output for incoming energy, a detailed diagnosis can be performed.

R24, 25 is electric energy and measured as an output of the terminal of the generator. The electric grid 25 that is a power transmission function and the end users 26 are not diagnosed. Although R24, 27 is exhaust heat, it is not directly measured. Thus, in a detailed diagnosis, R24, 27 is estimated with a balance of energy generated in the core 20 and the output of the generator and heat R27, 28 exhausted to the outside 28, which is a sea.

R27, 28 is heat exhausted to the environment. R27, 28 is measured with the temperature at the exit of the condenser circulation water. In an energy balance calculation, circulation water flow rate (when not measured, rating value corresponding to the pump operating state may be used) and the temperature of the sea are combined with R27, 28. Since the temperature of sea-water affects the heat efficiency of the plant, R27, 28 is used as a functional determination value of the sink that is a heat exhaust place. R24, 29 is energy of extraction steam that flows in the feed water heater 29. Since the extraction steam flow rate is not measured, in a detailed diagnosis, R24, 29 is calculated with an increase of the temperature of the feed water.

R29, 22 is energy returned to the reactor. R29, 22 is determined with the measured temperature of the feed water. In a detailed diagnosis, the energy balance is calculated with the temperature of the feed water at the exit of the condenser, feed water flow rate, feed water pressure, and so forth.

A goal 14 represents the maintenance of mass for supporting the energy flow structure 12 (namely, the maintenance of main steam flow rate and feed water flow rate). Thus, the measurement parameters used for the determination are the main steam flow rate and the feed water flow rate.

A flow structure 13 represents a flow of a coolant as a carrier of energy transportation in the flow structure 12 (namely, the flow of a mass). In the flow structure 13, reference numeral 31 is a storage function of a coolant in the reactor pressure vessel. Reference numeral 32 is a coolant recirculation function of the core. Reference numeral 33 is a main steam transport function from the reactor pressure vessel 31 to a turbine. Reference numeral 34 is a distribution function of the turbine to extract steam for heating the feed water. Reference numeral 35 is a transport function of the exhaust steam from the turbine 34. Reference numeral 36 is an extraction steam transport function. Reference numeral 37 is a storage function equivalent to a hot well of the condenser. Reference numeral 38 is a feed water transport function to the reactor pressure vessel 31.

An energy flow structure 15 is a function for supporting the rotation of the feed water pump so as to accomplish the feed water transport function 38. An energy flow structure 16 is a pump drive function for supporting the core coolant recirculation function 32.

Since the reactor pressure vessel 31 in the flow structure 13 is a storage function of the coolant, the state of the function can be obtained from the measured water level. The coolant recirculation function 32 for transporting recirculated water is composed of recirculation pumps and jet pumps. R31, 32 is the total of the flows of the recirculation pumps and the suction flows of the jet pumps. However, only the flow rate of the recirculation pump is measured. R32, 31 is a reactor inner recirculation water flow that is the total of the flows of the recirculation pumps and the flows of the jet pumps. R32, 31 flows into the core. R32, 31 is calculated for each jet pump. As the function of the recirculation pump, a suction flow rate, a rotation, and a discharge pressure have been measured to be used for a diagnosis.

R31, 33 is measured as a main steam line flow rate. The transport function 33 of the main steam can be determined with measured valve positions of a main steam isolation valve, a turbine bypass valve, and so forth as the state of the main steam line. R33, 34 is measured as a steam flow rate at the entrance of the main turbine. The turbine 34 has a function for distributing a steam flow R33, 34 to R34, 35 on the turbine exhaust side and R34, 36 on the extraction steam side. Since these flow rates are not measured, in a detailed diagnosis, R34, 36 is calculated with a designed distributive ratio. When the calculated result does not contradict all the evaluated results including the measured values, it is determined that the distribution function 34 of the turbine, the exhaust steam transport function 35, and the extraction steam transport function 36 are normal.

The condenser 37 stores condensed steam as condensate. The function of the condenser 37 can be measured as the water level of the condenser. R37, 38 is a flow from the condenser 37 to the feed water/condensate pump 38. R37, 38 is measured as a pump suction flow rate. The feed water transport function 38 is composed of a condensate pump and feed water pump. The feed water transport function 38 is measured as a discharge pressure, a pump rotation, and so forth. R38, 31 is a reactor feed water flow and measured as a feed water flow rate to the reactor pressure vessel 31.

The goal 18 represents the purpose to maintain a core recirculation flow rate of the flow structure 13. The goal 18 is evaluated with a drive power supply of the recirculation pump. Likewise, the goal 17 is evaluated with a drive power supply of the feed water/condensate pump. In addition, although a lubricant and a cooling function are also required, their description is omitted.

Figure 11:
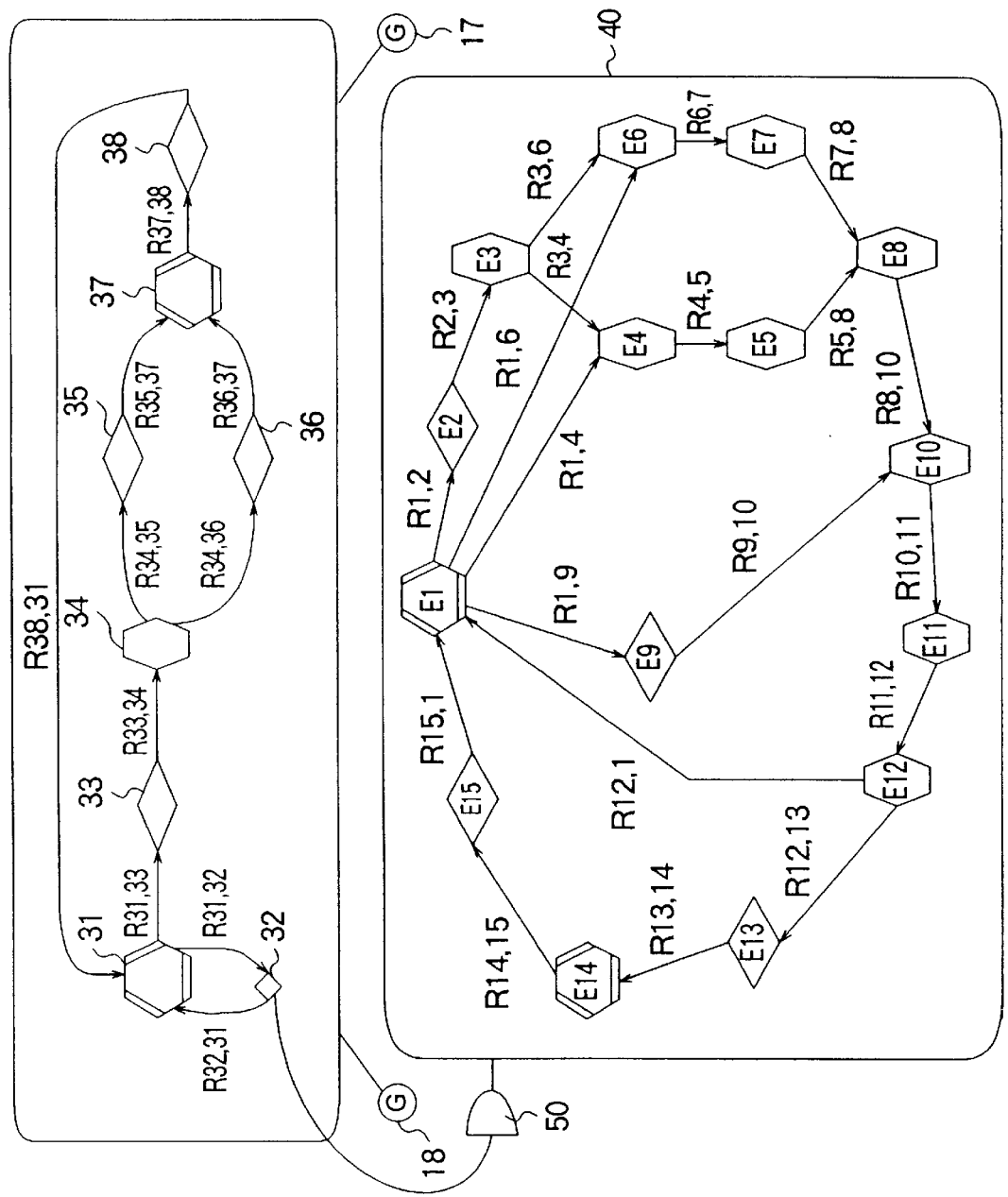
FIG. 11 is a schematic diagram showing an example of a detailed flow structure embedded to the plant model shown in FIG. 10.

A flow structure 40 in FIG. 11 shows a detail of the core coolant recirculation function 32 of the flow structure 13. The more aggregated flow structures 13 and the more decomposed flow structure 40 are linked with an aggregation/decomposition element 50. When it has been determined that the probability of the element 32 of the flow structure 13 as origin of failure is high, before the flow structure 12, the detailed flow structure 40 is diagnosed.

In the flow structure 40, E1 is the downcomer section of the reactor pressure vessel that has a storage function for storing a large amount of cooling water. E2 is the recirculation pump. Cooling water R1, 2 is extracted from the downcomer portion E1 of the pressure vessel and supplied as drive water R2, 3 of the jet pump to the header pipe E3.

The header pipe E3 branches drive water to the respective jet pumps. In this example, the real plant is simplified in such a manner that suction inlets of the jet pumps are denoted by E4 and E6. The jet pumps mix drive water R3, 6 and R3, 4 with suction flow R1, 6 and R1, 4 in throat portions E5 and E7 and supply the mixtures as jet pump flow R5, 8 and R7, 8 to the lower plenum E10.

E8 is a virtual element that represents the summation point of flow rates of the two jet pumps. E2–E8 is referred to as the first 1 recirculation loop. Although there are two recirculation loops, for simplicity, E9 represents the second recirculation loop. In other words, R1, 9 represents flows of the second recirculation loop that are equivalent to R1, 2, R1, 6, and R1, 4. R9, 10 corresponds to R8, 10.

As described above, in the recirculation loop, the recirculation pump can be modeled as a transport function, whereas the jet pump can be modeled as a balance function.

The cooling water that flows into the lower plenum E10 is supplied to the core portion E11 and thereby the core is cooled. Thus, the cooling water is heated and boiled. Thus, a two-phase flow takes place. The two-phase flow is separated by the separator E12 into steam and saturated water. The steam is supplied as the main steam flow R12, 13 to the main steam system E13. On the other hand, the saturated water is returned as R12, 1 to the pressure vessel's downcomer portion E1.

The main steam drives the turbine generator in the main steam system E13 and generates electricity. Thereafter, the main steam flows into the condenser E14. The condenser E14 is also a storage function for storing a large amount of condensate (namely, cooling water). Finally, the cooling water of the condenser E14 is returned as the reactor feed water flow R15, 1 to the reactor pressure vessel's downcomer portion E1 by a feed water/condensate system E15.

Among these flows, the recirculation pump suction flow R1, 2, the jet pump flows R5, 8, R7, 8, and R9, 10, the core entrance flow R10, 11, the main steam flow R12, 13, the turbine entrance flow R13, 14, the feed water/condensate pump suction flow R14, 15, and the reactor feed water flow rate R15, 1 are always measured.

When failure identifications for individual elements are performed after the failure propagation network is created (that is not shown), the measured amounts of the water level of the pressure vessel's downcomer portion E1, the discharge pressure of the recirculation pump E2, the water level of the condenser E14, and so forth can be used.

Next, with the plant model 4 shown in FIGS. 10 and 11, the plant anomaly diagnosing process according to the present invention will be described. As outline of an event to be diagnosed, when a trouble takes place in the jet pump that is a part of the recirculation system, the core flow rate decreases and thereby the reactor output and generator output slightly decrease.

Now, assume that measured values in normal state and measured values of flow functional elements that can be measured in the flow structures 12, 13, and 40 after occurrence of anomaly are set as follows. In addition, assume that these measured values are obtained from the state amount measuring unit 2 of the plant 1 that is operating.

| [Flow structure 12] | Normal value/value after anomaly |
|---|---|
| Goal 11: | 1100/1065 |
| Core 20: | 3293/3189 |
| R22, 23: | 4493/4359 |
| R23, 24: | 4493/4359 |
| R24, 25: | 1100/1065 |
| R29, 22: | 1201/1170 |

Although the reactor pressure temporarily drops, the pressure control system throttles the main steam flow rate and thereby the former pressure is restored. Thus, the storage function of the reactor pressure vessel 22 does not have a failure.

| [Flow structure 13] | Normal value/value after anomaly |
|---|---|
| Goal 14: | 72/70 |
| R31, 32: | 480/460 |
| R32, 31: | 480/460 |
| R31, 33: | 72/70 |
| R33, 34: | 72/70 |
| R37, 38: | 72/70 |
| R38, 31: | 72/70 |

| [Flow structure 40] | Normal value/value after anomaly |
|---|---|
| R1, 2: | 100/110 |
| R5, 8: | 120/100 |
| R7, 8: | 120/120 |
| R8, 10: | 240/220 |
| R9, 10: | 240/240 |
| R10, 11: | 480/460 |
| R12, 13: | 72/70 |
| R13, 14: | 72/70 |
| R14, 15: | 72/70 |
| R15, 1: | 72/70 |

The priorities in the normal operation are set as follows.

| [Goal priorities] | |
|---|---|
| Goal 11: | 2 |
| Goal 14: | 3 |
| Goal 17: | 4 |
| Goal 18: | 5 |

As these data show, when the recirculation flow rate decreases, the main steam flow rate decreases and thereby the entire mass balance of the plant varies. However, since a mass or energy does not leak from the entire plant, parameters that represent faults of storage function such as the water level of the reactor and the water level of the condenser do not vary. The purpose of the diagnosis function is to effectively detect the element that is seemed to be the origin of anomaly.

The diagnosing unit 5 diagnoses the plant anomaly with the plant model 4 shown in FIGS. 10 and 11 corresponding to the determined results of the measured values supplied from the measured value determining unit 3 and corresponding to the priority level of each goal.

First, elements whose measured values deviate from normal values are detected downward from the highest hierarchical level of the plant model 4 shown in FIG. 10 so as to create a failure propagation network. In this example, since the output of the power generator decreases, a goal 11 is determined as abnormal. Next, a flow structure 12 linked to the goal 11 is determined. In the flow structure 12, the reactor output, the main steam flow rate (energy), and the generator output are abnormal. Thus, the flow structure 12 is included in the failure propagation network.

With respect to a goal 14, since the feed water/ main steam flow rate decrease, the goal 14 is determined as abnormal. Likewise, with respect to a flow structure 13, the measured values are checked. Since the reactor recirculation water flow rate, the main steam flow rate, and the feed water flow rate are abnormal, the flow structure 13 is included in the failure propagation network.

With respect to a goal 17 and a goal 18, since a failure of the power supply system is not detected, the goal 17 and the goal 18 are not included in the failure propagation network.

Thus, as the failure propagation network, the goal 11, the flow structure 12, the goal 14, and the flow structure 13 are selected. A detailed diagnosis is performed for each flow structure. In reality, when a failure propagation network is created with a detailed plant model, a more larger network is created. However, the basic method is not different.

Since the priority of the goal 11 is the highest, the diagnosis is started from the network linked to the goal 11. The diagnosis is performed from a flow structure in the lowest hierarchical level linked to the goal 11 in the upward direction (in this case, from the flow structure 13). This is because it is assumed that the flow structure in the lower hierarchical level is close to the origin of the failure.

Parameters measured in the flow structure 13 are the core flow rate (R32, 31), the main steam (R31, 33 and R33, 34), the feed water/condensate flow rates (R37, 38 and R38, 31). All the measured values deviate from normal values and thereby they represent failures. However, with respect to their mass balances, the measured values are normal.

Next, the amount of deviation against the normal state is checked. When the amount of deviation is obtained by (normal value—abnormal value)/ normal value, the amounts of deviations of the core flow rate (R32, 31), the main steam (R31, 33 and R33, 34), and the feed water/condensate flow rate (R37, 38 and R38, 31) are as follows.

Core flow rate: (480−460)/480=0.042
Main steam: (72−70)/72=0.028
Feed water/condensate flow rate: (72−70)/72=0.028

Thus, it is determined that the most suspected failure source in the flow structure 13 is the core coolant circulation function 32. When the flow structure 13 has a detailed structure, the detailed structure is diagnosed with the highest priority.

In the flow structure 40 that is a detailed flow structure of the core coolant recirculation function 32, states of elements that are not measured are determined with elements whose states have been determined with measured values. Thus, it is determined whether or not all elements are normal. In reality, an element that is disposed between abnormal elements is determined as abnormal. In contrast, an element disposed between normal elements is determined as a normal element.

Elements determined as normal with measured values are the reactor pressure vessel's downcomer portion E1, the throat portion E7, the second recirculation loop E9, and the condenser E14. Since the reactor pressure vessel's downcomer portion E1 and the condenser E14 are storage functions and the measured water levels thereof do not vary, these functions are determined as normal.

Likewise, elements determined as abnormal are the recirculation pump E2, the throat portion E5, the first recirculation loop E8, the lower plenum E10, the core portion E11, the separator E12, the main steam system E13, and the feed water/condensate system E15.

Thus, the elements E3 and E4 disposed between the elements E2 and E5 determined as abnormal with measured values are determined as abnormal. On the other hand, the element E6 disposed between the elements E1 and E7 that are normal elements is determined as a normal element. In such a manner, all elements are determined whether or not are normal.

Next, elements that have been determined as abnormal are determined once again by estimating not-measured values through mass-balance calculations or by using restriction conditions other than the mass-balance.

For example, the element E2 is a recirculation pump that is a transport function. In addition to the suction flow rate, the discharge pressure is measured. Thus, even if the flow rate varies, with the relation of flow rate and pressure that represents the characteristic of the pump, the normality of the pump can be determined. With the restriction condition that represents the characteristic of the pump, the element E2 is determined as a normal element.

The flow rate R2, 3 to the element E3 is equal to the suction flow rate R1, 2. For a balance function such as the element E3, the distributive coefficient in the normal state is calculated beforehand. In this example, since it is designed that the flow rate at the jet pump suction inlet E4 is almost the same as the flow rate at the jet pump suction inlet E6, the distributive coefficient of the element E3 to the flows R3, 6 and R3, 4 is 0.5 in the normal state. In an abnormal state, when the flow rate R2, 3 is 110, since the element E6 is normal, the flow rate R3, 6 can be assumed to be 50. Thus, the flow rate R3, 4 becomes 60 and the distributive coefficient becomes around 0.55. Consequently, the element E3 is determined as abnormal.

Likewise, with respect to the element E4 that has a balance function, since the flow rate R3, 4 is 50 and the flow rate R4, 5 is 120 in the normal state, the distributive coefficient of the element E4 (namely, the ratio of the flow rate R3, 4 and the flow rate R4, 5) becomes 2.4. In an abnormal state, since the flow rate R3, 4 is 60 and the flow rate R5, 8 (=R4, 5) is 100, the distributive coefficient becomes 1.67. Thus, the element E4 is determined as abnormal.

Since the input flow rate and the output flow rate of the element E5 are balanced, the element E5 is determined as a normal element. The element E10 is just a mixing function. When the mass-balance of the element E10 is correct, even if the distributive coefficient of the element E10 becomes abnormal, the element E10 is determined as a normal element.

The element E11 is a balance element with 1 to 1 input/output relation. When the mass-balance of the element E11 is normal, the element E11 is determined as a normal element. However, this determination requires the assumption of the outgoing flow rate R11, 12. With respect to the element E12, with the mass-balance of the element E1 that has been determined as a normal element, the outgoing flow rate R12, 1 can be estimated. In other words, the incoming flow rate R15, 1 is 70. The outgoing flow rate R10, 11 is 460. Thus, the incoming flow rate R12, 1 is 390. The element E12 is a separator. In addition to the mass-balance, the distributive coefficient of steam and saturated water is important to evaluate. The distributive coefficient of the core flow rate R10, 11 (480) and the saturated water flow rate R12, 1 (408=480–72) in the normal state is (480–72)/480=0.85. Like-wise, in the abnormal state, the distributive coefficient is 390/460=0.85. Thus, in addition to the mass balance, the distributive coefficient that represents an important function is normal. In addition, the element E13 is determined as a normal element. The flow rate R11, 12 is obtained by adding the main steam flow rate R12, 13 (=70) and the saturated water flow rate R12, 1 (=390). Thus, R11, 12 is 460. Consequently, it can be considered that the flow rate R11, 12 is balanced with the core input flow rate R10, 11. Thus, the element E12 is determined as a normal element.

The element E13 is just a transport function. Since the incoming flow rate R12, 13 is balanced with the outgoing flow rate R13, 14, the element E13 is determined as a normal element. With respect to the element E15 that is a transport function, the incoming flow rate R14, 15 is balanced with the outgoing flow rate R15, 1. In addition, the evaluated result of the pump characteristic using the measured value of the pump discharge pressure (not shown) is normal. Thus, the element E15 is determined as a normal element.

When these results are generally determined, abnormal elements that finally reside are E3 and E4. The respective determined reasons of these elements are an abnormal distributive coefficient of the balance function. It is assumed that a trouble took place in a flow path and thereby the distributive coefficient became abnormal. When the position of anomaly can be detected, several alternatives of the cause of the failure of the function can be obtained through experience or in-advance evaluation.

In the above-described example of the anomaly diagnosis, the origin of anomaly is detected in the lowest hierarchical level of the plant model 4. Thus, the diagnosis is completed. However, if a failure cannot be detected in the flow structure 40, the detection of the failure is accomplished in the higher hierarchical levels (flow structure 13 and 12).

The display unit 6 displays these diagnosing processes so that the operator can know the position at which the failures were detected, and the reason why the position was specified. The display unit 6 displays the range of the anomaly if the position of the failures could not be specified, so that the diagnosis range can be narrowed.

As described above, according to the diagnosing method of the present invention, although a failure that took place in the plant instrument causes some process amounts to vary and not-measured amounts are included, functionally more important positions of abnormal range can be treated with higher priority corresponding to the hierarchical plant model. When the abnormal element has a detailed model, the model is further diagnosed. Thus, the determination and detection of failures can be accurately and rapidly accomplished. Moreover, the inferring process is similar to the inferring method of the operator (human). Thus, the operator can easily understand the process.

Figure 12:
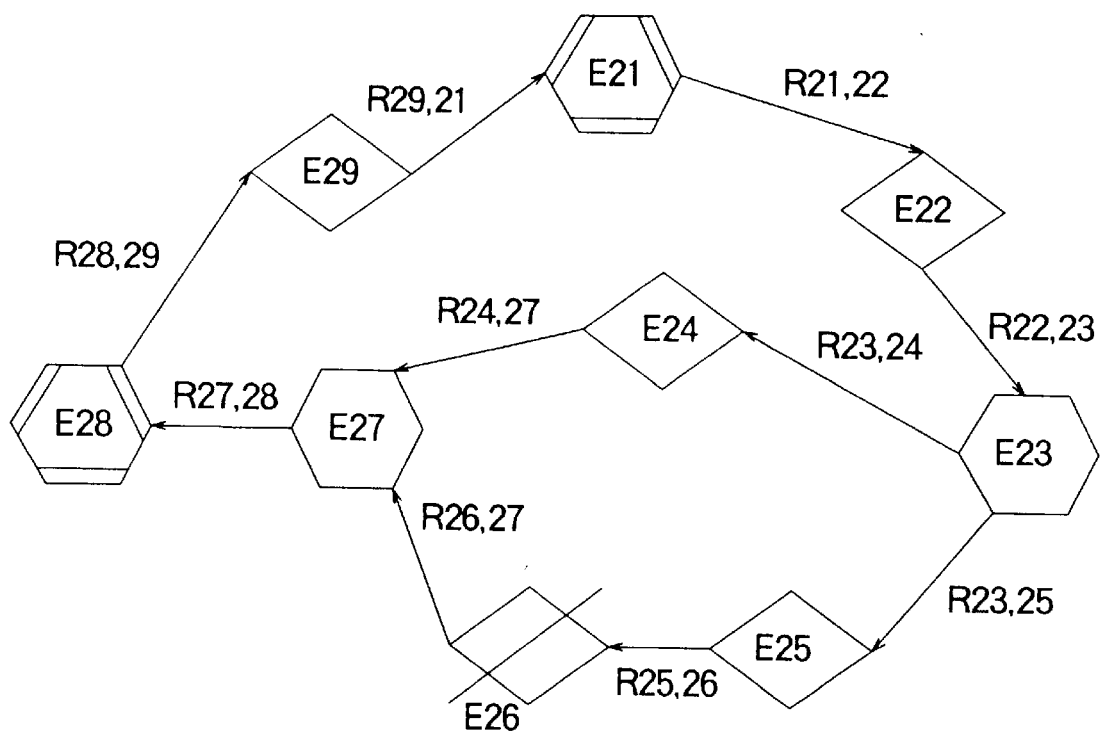
FIG. 12 is a schematic diagram showing another example of a detailed flow structure of a plant model of a BWR nuclear power plant used to explain another example of the plant diagnosis according to the present invention.

FIG. 12 shows a detailed flow structure around a feed water/condensate system disposed between the condenser 37 and the reactor pressure vessel 31 in the flow structure shown in FIG. 11. With this flow structure, another example of the anomaly diagnosis will be described. However, this flow structure is simplified in such a manner that the description of the diagnosing method is not affected.

In FIG. 12, an element E21 is a condenser that is a water source of a condenser pump E22. A feed water flow R22, 23 pressured by the condenser pump E22 is branched into two paths by a header E23. As the first path, R23, 24 is supplied to a feed water pump E24 in the normal operation state. An element E25 is a backup feed water pump in a standby condition. A check valve E26 is disposed on the output side of the element E25 so as to prevent an adverse flow. A feed water flow R24, 27 is supplied from the feed water pump E24 to a header E27. The header E27 mixes the feed water flow R24, 27 with a feed water flow R26, 27 (normally, 0) and supplies the result as a feed water flow R27, 28 to a reactor pressure vessel E28. Steam as R28, 29 is supplied from the reactor pressure vessel E28 to the condenser E21 through a main steam system E29. Thus, the steam of the reactor pressure vessel E28 is circulated as return feed water.

In this example, values to be measured are the condensate pump suction flow rate R21, 22, the feed water pump suction flow rates R23, 24 and R23, 25, the feed water flow rate R27, 28, the main steam flow rate R28, 29, and the turbine inlet flow rate R29, 21. Along with the values of the earlier example, normal values of these flow rates and values after anomaly are as follows:

|  | Normal value/Value after anomaly |
| --- | --- |
| R21, 22: | 72/72 |
| R23, 24: | 72/80 |
| R23, 25: | 0/0 |
| R27, 28: | 72/72 |
| R28, 29: | 72/72 |
| R29, 21: | 72/72 |

In this example, it is assumed that the check valve E26 is failed and part of feed water reversely flow to the backup pump E25. Thus, although the flow instrument at the backup pump E25 cannot measure the reverse flow, the suction flow rate R23, 25 does not vary and the suction flow rate R23, 24 of the feed water pump E24 in the operating state increases as a closed loop.

In this situation, the number of parameters that vary is just one. In the above-described diagnosing process for the earlier example (referred to as the first diagnosing step), as will be described later, a failure cannot be detected. In other words, corresponding to the determined result of the measured amount determining unit 3, only the feed water pump E24 is determined as abnormal. However, the discharge pressure of the feed water pump E24 is measured. Due to the restriction condition of the characteristic of the feed water pump E24, it is determined as a normal element. Thus, an abnormal element cannot be successfully detected. (Hereinafter, this measured result is referred to as first diagnosed result.)

As a cause, it is considered that elements that have been determined as normal elements have not been correctly measured. Thus, with a particular assumption, an inference should be performed once again. In this example, it is assumed that an element that is close to an element that has been determined as abnormal in the first failure determination has a failure. In addition, it is assumed that the relevant measured value of the element is not correct. With a mass balance and restriction condition, the element is evaluated once again. This assumption is based on the precondition that a failure propagates along a path between elements.

Thus, as the next diagnosis step, in addition to the element E24, an inference is performed assuming that the elements E23 and E27 disposed close to the element E24 are abnormal. Since the element E26 as a barrier element that is not measured is disposed downstream of the normal element E25, the element E26 is determined as a normal element.

Next, state amounts of elements assumed as abnormal elements by such an inference are estimated. With mass balances and the other restriction conditions, these elements are determined whether or not they are abnormal. The transport function E24 that has a restriction condition that represents the relation between the discharge pressure of the pump and the flow rate can be evaluated as a normal element because of the relation between the flow rate and the discharge pressure. Since the element E23 was assumed as an abnormal element, the mass balance thereof is evaluated. With the mass balance of the element E23, it is considered that the incoming flow rate R22, 23 is equal to the suction flow rate R21, 22 of the transport function E22 that is a normal element on the upstream side. Thus, it is assumed that the incoming flow rate R22, 23 is 72. In addition, although the flow rate R23, 25 is a measured amount, as was described above, since the flow rate R23, 25 may have not been correctly measured, it is calculated with the mass balance as follows.

$$R22, 23 - R23, 24 = 72 - 80 = -8$$

The suction flow rates R21, 22 and R23, 24 can be evaluated with the restriction condition of the pump. Thus, it can be considered that the reliability of the suction flow rates R21, 22 and R23, 24 is higher than that of the flow rate R23, 25. Likewise, with respect to the element E27, the incoming flow rate R24, 27 is equal to R23, 24. Thus, the incoming flow rate R24, 27 is 80. The measured value of the outgoing flow rate R27, 28 is 72. Thus, with the mass balance, the flow rate R26, 27 becomes:

$$R26, 27 = R27, 28 - R24, 27 = 72 - 80 = -8$$

With the information obtained at the above diagnosing step, when a general determination is performed, the transport function E24 can be determined as a normal element due to the characteristic of the pump. Since the flow rate R23, 25 is negative and the distributive ratio is abnormal, the element E23 as a balance element is determined as an abnormal element. This applies to the element E27. With respect to the transport function E25, the measured incoming flow rate R23, 25 does not accord with the result of the mass balance. With knowledge that the instrument in this portion cannot measure a reverse flow, it is determined that the calculated result of the mass balance is proper. Thus, the flow direction of the function E25 is not correct as a transport function and is generally determined as an abnormal element. Although the element E26 is a barrier function, since R26, 27 reversely flows, the element E26 is determined as an abnormal element.

Thus, elements that have been determined as abnormal elements are E23, E25, E26, and E27. Among these elements, the mass balance of each of E23, E25, and E27 is normal, whereas the distributive ratio thereof is abnormal. However, with respect to the element E26, the basic function as a barrier is abnormal. Due to a failure of the barrier function, the reverse flow took place as the main cause in the anomaly diagnosis.

When an abnormal element cannot be detected in the first diagnosed result, another diagnosing method can be applied. In this diagnosing method, due to the relation of linkage of elements in the first stage, even if elements that do not have measured values are determined as normal, the flow rates are estimated with the mass balance or the like.

In the above-described event, since the elements E23, E26, and E27 are not-measured elements, their mass balance is calculated. With respect to the element E23, the incoming flow rate R22, 23 equals to R21, 22 and thereby is 72. The outgoing flow rate R23, 24 is 80. The flow rate R23, 25 is 0. Thus, the mass balance of E23 is abnormal. With respect to the element E26, both the incoming flow rate R25, 26 and the outgoing flow rate R26, 27 equal to R23, 25 and thereby are 0. With respect to the element E27, the incoming flow rate R24, 27 equals to R23, 24 and thereby is 80. R26, 27 is 0. Thus, the mass balance of E27 is abnormal.

When the mass balance is abnormal, with an assumption that the relevant values have not been correctly measured, the flow rates thereof are estimated. The upstream side flow rate R21, 22 of R22, 23 of the element E23 can be determined as normal with the transport function E22 and a restriction condition of the relation with the pump discharge pressure. This applies to R23, 24. Since the pump of the transport function E25 stops, the similar restriction condition cannot be used. Thus, R23, 25 may have not been correctly measured. With the mass balance calculation, R23, 25 becomes a negative flow rate. Finally, corresponding to such information, a general determination is performed and the same result as the above-described diagnosing method can be obtained.

As another diagnosing method in the case that the first diagnosed result is contradictory, an inference can be performed with an assumption that a directly measured value is not correct. In this diagnosing method, as described above, a measured value that is assumed as abnormal is most close to an element of which the failure has been observed.

For example, in FIG. 12, R23, 25 is most close to the measured value R23, 24 of the element E24 that has been determined as an abnormal element, R23, 25 is assumed as abnormal. In this state, the elements E24 and E25 (measured values are abnormal) and elements E23, E26, and E27 (disposed between the abnormal elements E24 and E25) are determined as abnormal elements. Thus, in the first stage, only the element E24 was determined as an abnormal element. However, in the next stage, with an assumption that measured values are not correct, five elements are determined as abnormal elements. The five elements that have been determined as abnormal elements are judged with the mass-balance and restriction condition thereof.

The transport function E24 that has the restriction condition representing the relation between the discharge pressure of the pump and the flow rate can be evaluated with the relation between the flow rate and the discharge pressure. With respect to the element E23 determined as an abnormal element, the mass balance is evaluated. With respect to the mass balance of the element E23, it is assumed that R22, 23 equals to the suction flow rate R21, 22 of the transport function E22 that is a normal element on the upstream side and thereby is 72. On the other hand, R23, 24 is 80. Consequently, corresponding to the mass balance, R23, 25 assumed to have been correctly measured becomes:

$$R22, 23-R23, =24\ 72=-80\ -8$$

Thus, R25, 26 and R26, 27 are successively assumed as −8 each. With respect to E27, R24, 27 is equal to R23, 24 (=80) and R27, 28 is a measured value (=72). Thus, the mass balance is calculated as follows.

$$R26, 27+R24, 27-R27, 28=-8+80-72=0$$

Consequently, with the above mass balance, the element E27 is determined as a normal element.

When a general determination is performed with the determined results, the element E24 is determined as a normal element because of the restriction condition of the pump. On the other hand, although the mass balance of each of the elements E23 and E27 is normal, since there is a reverse flow, the distributive ratio is abnormal. Thus, although the elements E23 and E27 are abnormal, they are not determined as the main cause in the plant model shown in FIG. 12. This applies to the element 25. Since the element E26 is a one-way barrier function (check valve), a negative flow rate represents that the function is failed. In this example, the element E26 is determined as the origin of the failure.

According to the present invention, with a plant model in an abstract function level, an anomaly of the plant is diagnosed in the above-described diagnosing method. Thus, the following effects can be obtained.

(1) Since the model is based on a normal plant function rather than particular anomalies, an unanticipated event does not stop the diagnosis.

(2) Since the model is based on the human cognitive process, even if a large-scaled complicated plant is a target, the model can be simplified to a level that the operator can understand. Thus, the inferred results can be easily understood by the operator.

(3) Since the model is based on the natural invariants such as mass balance and energy balance, the reliability of the inferred results is high.

(4) Since the diagnosis for the plant anomaly can be started from the functionally more important regions corresponding to a functionally hierarchical model of the plant, the activity rate and safety of the plant that are important functions are efficiently maintained.

(5) Since the model is separated from an inference engine, various processes can be diagnosed by changing the model. In addition, the model can be flexibly modified corresponding to a change of the plant process.

(6) Since an inference is based on hypothesis and test, it can be easily understood. In addition, with an assumption of the diagnosed result of the anomaly diagnosing apparatus, the operator can verify the diagnosed result. Thus, a manmachine cooperated system can be accomplished.

(7) An object of the model can be placed at any portion (system or machine) in the plant. The portion of the object can be structured in detail. The other portion can be simply structured. Thus, a diagnosis for each object can be rapidly performed.

(8) The priorities of elements that have higher probability of a failure are inferred by a diagnosis using a simplified model. The diagnosis for identifying the origin of anomaly is accomplished according to the element priorities. When an element determined as abnormal, has a detailed model, it is diagnosed. Thus, the diagnosis can be rapidly performed with small errors.

(9) A detailed model can be added through experience of abnormal events of the plant. Thus, the experience can be effectively stored.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A method for diagnosing a plant anomaly corresponding to measured data supplied from the plant, the method comprising the steps of:

sampling the measured data;

deciding from the sampled measured data whether a state of each function of the plant is normal; and inferring an origin of the plant anomaly from a plant model in an abstract function level, the plant model being composed of model elements, by determining whether a state of each of the model elements is normal starting downward from the top of a hierarchy of the plant model corresponding to information obtained in the deciding step, the plant model having a goal and a flow structure, the goal representing a purpose to be accomplished by a lower flow structure and a condition for supporting a higher flow structure, and the flow structure being represented by flow of either of mass or energy through a flow function; and detecting a failure propagation network having each model element which has not been determined as a normal element in the model element determining step.

2. The method as set forth in claim 1, wherein the inferring step includes the steps of:

determining a diagnosing order of each flow structure of the failure propagation network; and diagnosing the flow structure of the failure propagation network to detect a failed flow function corresponding to the determined diagnosing order.

3. The method as set forth in claim 2, wherein the diagnosing order determining step includes the step of assigning a higher priority of diagnosis to the lower flow structure of a network unit linked to the goal having a higher priority in the failure propagation network, the network unit being separated from other units in the failure propagation network.

4. The method as set forth in claim 2, wherein the diagnosing step includes a first hypothesis step of assuming that each flow function on each path linked between flow functions determined as abnormal with measured data not through a flow function determined as normal with the measured data is abnormal in the flow structure to be diagnosed.

5. The method as set forth in claim 2, wherein the inferring step includes the step of diagnosing a more detailed flow structure into which the detected failed flow function is decomposed to detect the origin of the plant anomaly in detail.

6. The method as set forth in claim 4, wherein the diagnosing step includes the steps of:
estimating a state amount related to each flow function assumed as abnormal in the first hypothesis step;
evaluating whether or not each flow function determined as abnormal by the first hypothesis step is abnormal with the estimated state amount based on a deviation from a normal value, a balance of input and output of the flow function, and a restriction corresponding to a type of the flow function; and
detecting an origin of failure of the flow structure based on a rule of experience corresponding to an evaluated result.

7. The method as set forth in claim 6, wherein the diagnosing step includes a second hypothesis steps of:
assuming that a flow function adjacent to the flow function determined as abnormal with the measured data is abnormal, when any failed flow function cannot be identified in the origin detecting step; and
assuming that each flow function on each path linked between the abnormal flow functions not through the flow function determined as normal with the measured data is abnormal.

8. The method as set forth in claim 7, wherein the diagnosing step includes the steps of:
estimating a state amount related to each flow function assumed as abnormal in the second hypothesis steps; and
evaluating whether or not each flow function determined as abnormal by the second hypothesis steps is abnormal with the estimated state amount based on a deviation from a normal value, a balance of input and output of the flow function, and a restriction corresponding to a type of the flow function.

9. The method as set forth in claim 6, wherein the diagnosing step includes the steps of:
estimating a state amount related to each flow function assumed as normal in the first hypothesis step, when any failed flow function cannot be identified in the origin detecting step; and
evaluating whether or not each flow function assumed as normal in the first hypothesis step is normal with the estimated state amount based on a deviation from a normal value, a balance of input and output of the flow function, and a restriction corresponding to a type of the flow function.

10. The method as set forth in claim 6, wherein the diagnosing step includes a third hypothesis steps of:
assuming that a flow function determined as normal with the measured data is abnormal, said flow function being most close to a flow function determined as abnormal with the measured data, when any failed flow function cannot be identified in the origin detecting step; and
assuming that each flow function on each path linked between the abnormal flow functions not through the other flow function determined as normal with the measured data is abnormal.

11. The method as set forth in claim 10, wherein the diagnosing step includes the steps of:
estimating a state amount related to each flow function assumed as abnormal in the third hypothesis steps; and
evaluating whether or not each flow function determined as abnormal by the third hypothesis steps is abnormal with the estimated state amount based on a deviation from a normal value, a balance of input and output of the flow function, and a restriction corresponding to a type of the flow function.

12. A method for diagnosing a plant anomaly corresponding to measured data supplied from the plant, the method comprising the steps of:
sampling the measured data;
deciding from the sampled measured data whether a state of each function of the plant is normal; and
inferring an origin of the plant anomaly with a plant model in an abstract function level corresponding to information obtained in the measured data deciding step, the plant model having a flow structure represented by flow of mass or energy through a flow function,
wherein the inferring step includes the steps of
a first hypothesis step of assuming that each flow function on each path linked between flow functions determined as abnormal with measured data not through a flow function determined as normal with the measured data is abnormal in the flow structure;
estimating a state amount related to each flow function assumed as abnormal in the first hypothesis step;
evaluating whether each flow function determined as abnormal by the first hypothesis step is abnormal with the estimated state amount based on a deviation from a normal value, a balance of input and output of the flow function, and a restriction corresponding to a type of the flow function; and
detecting an origin of failure of the flow structure based on a rule of experience corresponding to an evaluated result.

13. The method as set forth in claim 12, wherein the inferring step includes the steps of
second hypothesis steps of assuming that a flow function adjacent to the flow function determined as abnormal with the measured data is abnormal, when any failed flow function cannot be identified in the detecting step, and assuming that each flow function on each path linked between the abnormal flow functions not through the flow function determined as normal with the measured data is abnormal;
estimating a state amount related to each flow function assumed as abnormal in the presuming step; and
evaluating whether or not each flow function determined as abnormal by the second hypothesis steps is abnormal with the estimated state amount based on a deviation from a normal value, a balance of input and output of the flow function, and a restriction corresponding to a type of the flow function.

14. The method as set forth in claim 12, wherein the inferring step includes the steps of:
   estimating a state amount related to each flow function assumed as normal in the first hypothesis step, when any failed flow function cannot be identified in the detecting step; and
   evaluating whether or not each flow function assumed as normal in the first hypothesis step is normal with the estimated state amount based on a deviation from a normal value, a balance of input and output of the flow function, and a restriction corresponding to a type of the flow function.

15. The method as set forth in claim 12, wherein the inferring step includes the steps of:
   third hypothesis steps of assuming that a flow function determined as normal with the measured data is abnormal, said flow function being most close to a flow function determined as abnormal with the measured value, when any failed flow function cannot be identified in the detecting step, and assuming that each flow function on each path linked between the abnormal flow functions not through the other flow function determined as normal with the measured data is abnormal;
   estimating a state amount related to each flow function assumed as abnormal in the third hypothesis steps; and
   evaluating whether or not each flow function determined as abnormal by the third hypothesis steps is abnormal with the estimated state amount based on a deviation from a normal value, a balance of input and output of the flow function, and a restriction corresponding to a type of the flow function.

16. An apparatus for diagnosing an anomaly of a plant corresponding to measured data supplied from the plant, comprising:
   means for storing a plant model hierarchically representing function of the plant in an abstract function level, the plant model having a flow structure and a goal as a model element, the flow structure being represented by flow of either of mass or energy through a flow function, and the goal representing a purpose to be accomplished by a lower flow structure and a condition for supporting a higher flow structure;
   measured amount deciding means for obtaining a state amount related to the plant model corresponding to the measured data and comparing the state amount with a threshold thereof so as to decide whether or not the state amount is normal;
   means for inferring an origin of the anomaly of the plant using the plant model corresponding to information supplied from said measured amount determining means; and
   a display unit for displaying an inference process and result supplied from said inferring means,
   wherein said inferring means includes
   means for determining whether a functional state of each model element is normal downward from the top in a hierarchy of the plant model based on the information supplied from the measured amount determining means; and
   means for detecting a failure propagation network having each model element which has not been determined as normal by said model element determining means.

17. The apparatus as set forth in claim 16, wherein said model element determining means has means for determining that a model element including a state amount determined as abnormal by said measured amount determining means is abnormal.

18. The apparatus as set forth in claim 16, wherein said inferring means includes
   means for assigning a higher priority of diagnosis to the lower flow structure of a network unit linked to the goal having a higher priority in the failure propagation network, the network unit being separated from other units in the failure propagation network; and
   means for diagnosing the flow structure corresponding to the priorities of diagnosis of the flow structures in the failure propagation network so as to detect a failed flow function.

19. The apparatus as set forth in claim 16, wherein said display unit displays the inference process and result using the failure propagation network.

20. The apparatus as set forth in claim 18, wherein said diagnosing means has means for diagnosing a more detailed flow structure into which the detected failed flow function is decomposed so as to detect the origin of the anomaly in detail.

21. The apparatus as set forth in claim 18, wherein said diagnosing means includes:
   first hypothesis means for assuming that each flow function on each path linked between flow functions determined as abnormal by said measured amount determining means not through a flow function determined as normal by said measured amount determining means is abnormal in the flow structure to be diagnosed;
   means for estimating a state amount related to each flow function assumed as abnormal by the first hypothesis means;
   means for evaluating whether or not each flow function determined as abnormal by said first hypothesis means is abnormal with the estimated state amount based on a deviation from a normal value, a balance of input and output of the flow function, and a restriction corresponding to a type of the flow function; and
   first detecting means for detecting an origin of failure of the flow function based on rule of experience corresponding to an evaluated result.

22. The apparatus as set forth in claim 21, wherein said diagnosing means includes:
   second hypothesis means for assuming that a flow function adjacent to the flow function determined as abnormal by said measured amount determining means is abnormal when any failed flow function cannot be identified by said first detecting means and assuming that each flow function on each path linked between the abnormal flow functions not through the flow function determined as normal by said measured amount determining means is abnormal;
   means for estimating a state amount related to each flow function assumed as abnormal by said second hypothesis means;
   means for evaluating whether or not each flow function determined as abnormal by said second hypothesis means is abnormal with the estimated state amount based on a deviation from a normal value, a balance of input and output of the flow function, and a restriction corresponding to a type of the flow function; and
   means for detecting an origin of failure of the flow function based on the rule of experience corresponding to an evaluated result.

23. The apparatus as set forth in claim 24, wherein said diagnosing means includes:
   means for estimating a state amount related to each flow function assumed as normal by said first hypothesis means when any failed flow function cannot be identified by said first detecting means;

means for evaluating whether or not each flow function assumed as normal by said first hypothesis means is normal with the estimated state amount based on a deviation from a normal value, a balance of input and output of the flow function, and a restriction corresponding to a type of the flow function; and means for detecting an origin of failure of the flow function based on the rule of experience corresponding to an evaluated result.

24. The apparatus as set forth in claim 21, wherein said diagnosing means includes:

third hypothesis means for assuming that a flow function determined as normal by said measured amount determining means and most close to a flow function determined as abnormal by said measured amount determining means is abnormal when any failed flow function cannot be detected by said first detecting means and assuming that each flow function on each path linked between the abnormal flow functions not through the other flow function determined as normal by said measured amount determining means is abnormal;

means for estimating a state amount related to each flow function assumed as abnormal by said third hypothesis means;

means for evaluating whether or not each flow function determined as abnormal by said third hypothesis means is abnormal with the estimated state amount based on a deviation from a normal value, a balance of input and output of the flow function, and a restriction corresponding to a type of the flow function; and means for detecting an origin of failure of the flow function based on the rule of experience corresponding to an evaluated result.

25. An apparatus for diagnosing an anomaly of a plant corresponding to measured data supplied from the plant, comprising:

means for storing a plant model in an abstract function level, the plant model having a flow structure represented by flow of mass or energy through a flow function;

measured amount deciding means for obtaining a state amount related to the plant model corresponding to the measured data and comparing the state amount with a threshold thereof so as to decide whether or not the state amount is normal;

means for inferring an origin of the anomaly of the plant using the plant model corresponding to information supplied from said measured amount determining means; and a display unit for displaying an inference process and result supplied from said inferring means, wherein said inferring means includes:

first hypothesis means for assuming that each flow function on each path linked between flow functions determined as abnormal by said measured amount determining means not through a flow function determined as normal by said measured amount determining means is abnormal in the plant model;

means for estimating a state amount related to each flow function assumed as abnormal by said first hypothesis means;

means for evaluating whether or not each flow function determined as abnormal by said first hypothesis means is abnormal with the estimated state amount based on a deviation from a normal value, a balance of input and output of the flow function, and a restriction corresponding to a type of the flow function; and first detecting means for detecting an origin of failure of the flow function based on a rule of experience corresponding to an evaluated result.

26. The apparatus as set forth in claim 25, wherein said inferring means includes:

second hypothesis means for assuming that a flow function adjacent to a flow function determined as abnormal by said measured amount determining means is abnormal when any failed flow function cannot be identified by said first detecting means and assuming that each flow function on each path linked between the abnormal flow functions not through the flow function determined as normal by said measured amount determining means is abnormal;

means for estimating a state amount related to each flow function assumed as abnormal by said second hypothesis means;

means for evaluating whether or not each flow function determined as abnormal by said second hypothesis means is abnormal with the estimated amount state based on a deviation from a normal value, a balance of input and output of the flow function, and a restriction corresponding to a type of the flow function; and means for detecting an origin of failure of the flow function based on the rule of experience corresponding to an evaluated result.

27. The apparatus as set forth in claim 25, wherein said inferring means includes means for estimating a state amount related to each flow function assumed as normal by said first hypothesis means when any failed flow function cannot be identified by said first detecting means;

means for evaluating whether or not each flow function assumed as normal by said first hypothesis means is normal with the estimated state amount based on a deviation from a normal value, a balance of input and output of the flow function, and a restriction corresponding to a type of the flow function; and means for detecting an origin of failure of the flow function based on the rule of experience corresponding to an evaluated result.

28. The apparatus as set forth in claim 25, wherein said inferring means includes:

third hypothesis means for assuming that a flow function determined as normal by said measured amount determining means and most close to a flow function determined as abnormal by said measured amount determining means is abnormal when any failed flow function cannot be detected by said first detecting means and assuming that each flow function on each path linked between the abnormal flow functions not through the other flow function determined as normal by said measured amount determining means is abnormal;

means for estimating a state amount related to each flow function assumed as abnormal by said third hypothesis means;

means for evaluating whether or not each flow function determined as abnormal by said third hypothesis means is abnormal with the estimated state amount based on a deviation from a normal value, a balance of input and output of the flow function, and a restriction corresponding to a type of the flow function; and means for detecting an origin of failure of the flow function based on the rule of experience corresponding to an evaluated result.

* * * * *